(12) United States Patent
McConnell et al.

(10) Patent No.: US 7,925,523 B1
(45) Date of Patent: Apr. 12, 2011

(54) METHOD AND SYSTEM FOR PROVIDING INSURANCE POLICIES VIA A DISTRIBUTED COMPUTING NETWORK

(75) Inventors: Frank J. McConnell, Issaquah, WA (US); William M. Tormey, Bothell, WA (US); Anne H. Randall, Issaquah, WA (US); Dennis M. Ellermeier, Seattle, WA (US); Greg S. Johannesen, Seattle, WA (US); Jason J. Lewis, Seattle, WA (US); Edward V. Lenoir, Brier, WA (US)

(73) Assignee: Safeco Corporation, Seattle, WA (US)

( * ) Notice: Subject to any disclaimer, the term of this patent is extended or adjusted under 35 U.S.C. 154(b) by 2334 days.

(21) Appl. No.: 09/658,770

(22) Filed: Sep. 11, 2000

(51) Int. Cl.
*G06Q 40/00* (2006.01)
(52) U.S. Cl. .......................................... 705/4
(58) Field of Classification Search ................ 705/2, 4, 705/400, 38, 1, 3, 27; 235/381; 283/54
See application file for complete search history.

(56) References Cited

U.S. PATENT DOCUMENTS

| | | | |
|---|---|---|---|
| 4,567,359 A | | 1/1986 | Lockwood |
| 4,831,526 A | * | 5/1989 | Luchs et al. ........... 705/4 |
| 4,975,840 A | | 12/1990 | DeTore et al. |
| 5,191,522 A | * | 3/1993 | Bosco et al. ........... 705/4 |
| 5,523,942 A | | 6/1996 | Tyler et al. |
| 5,537,315 A | * | 7/1996 | Mitcham .............. 705/4 |
| 5,611,052 A | | 3/1997 | Dykstra et al. |
| 5,797,134 A | | 8/1998 | McMillan et al. |
| 5,809,478 A | | 9/1998 | Greco et al. |
| 5,845,256 A | | 12/1998 | Pescitelli et al. |
| 5,873,066 A | | 2/1999 | Underwood et al. |
| 5,884,274 A | | 3/1999 | Walker et al. |
| 5,930,760 A | | 7/1999 | Anderton et al. |
| 6,347,302 B1 | * | 2/2002 | Joao .................. 705/4 |

OTHER PUBLICATIONS

CNA Customer Services website. Mar. 2000. URL: <http://web.archive.org/web/20000311214508/www.cna.com/group/custserv/gr_state.html>.*
MostChoice Advisor website.Aug. 2000.URL: <http://web.archive.org/web/20000818065246/www.mostchoice.com/General/Advisor_Center/Why/G_Adv_Why_Overview.cfm>.*
Expanded Access To Insur. Info.Rept.of Accomplishments1995-1998.CA DeptofInsurance. Mar. 1999. [Retr Feb. 24, 2003] Retr <http://web.archive.org/web/20000819132020/http://www.insurance.ca.gov/EXECUTIVE/Protecting_California's_Consumers/expanded.pdf>.*
Listing of Archived web pages of MostChoice.com, as archived at www.archive.org library service: Downloaded from Internet on May 16, 2005. URL: <http://web.archive.org/web/*/http://www.mostchoice.com>.*
Web page showing that MostChoice's Web site is under construction. http://web.archive.org/web/20000818065635/www.mostchoice.com/under_construction.cfm [retrieved May 8, 2003].

* cited by examiner

*Primary Examiner* — Gerald J. O'Connor
*Assistant Examiner* — Natalie A Pass
(74) *Attorney, Agent, or Firm* — Christensen O'Connor Johnson Kindness PLLC

(57) ABSTRACT

A virtual insurance producer Web site is provided at which a prospective insurance customer may request a bindable premium quotation for an insurance policy. If the policy may be underwritten, the Web site calculates a premium for the insurance policy. The premium is displayed to the prospective customer as a bindable quotation that binds the insurance company providing the policy and that may be purchased on-line immediately. The prospective customer may purchase the insurance policy according to the provided bindable premium quotation through the virtual insurance producer Web site. If the prospective customer elects to purchase the policy, the virtual insurance producer Web site may re-intermediate an insurance agent into the sales process and transmit the insurance policy to the customer in electronic form.

10 Claims, 16 Drawing Sheets

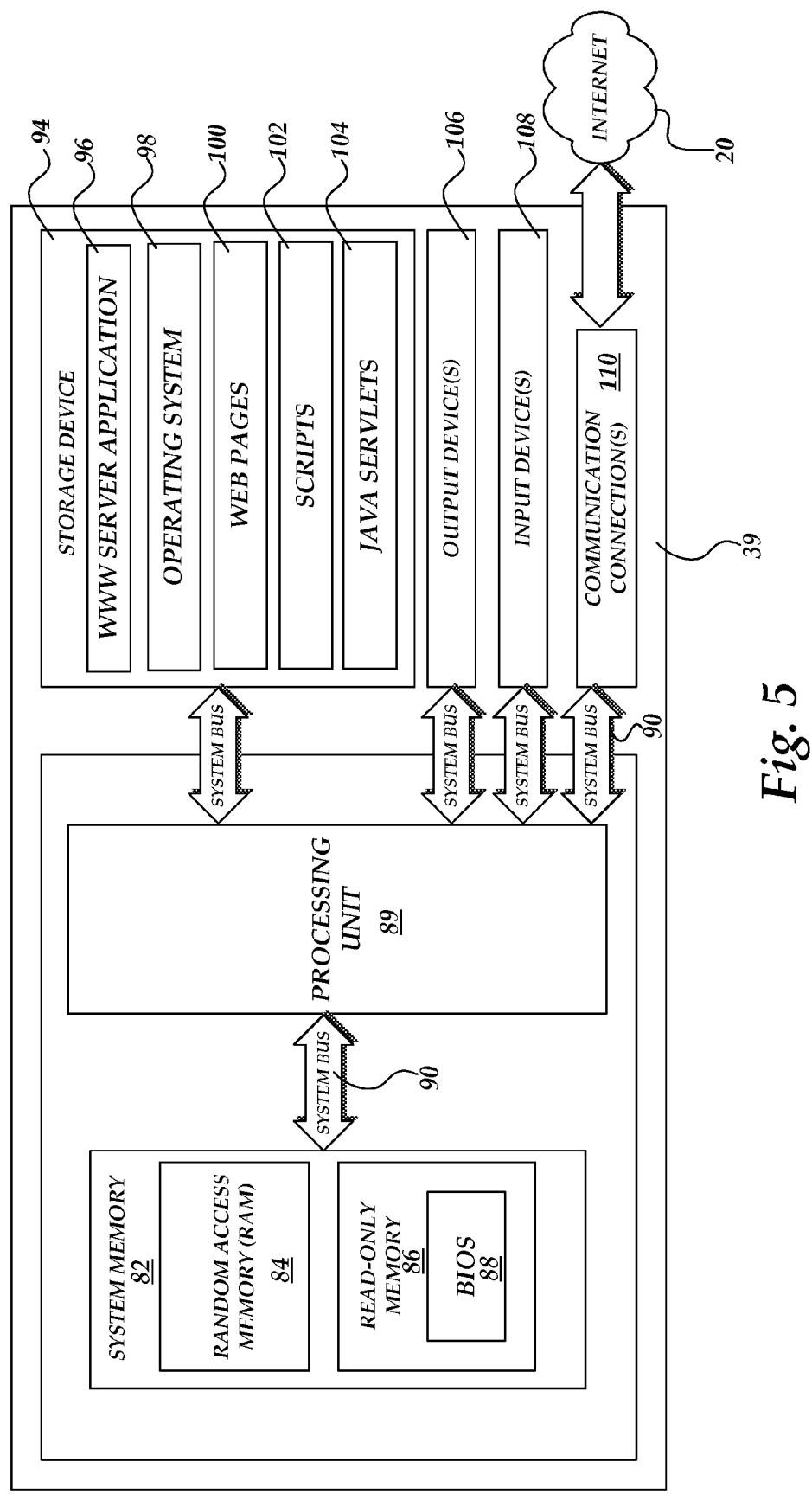

Fig. 7C

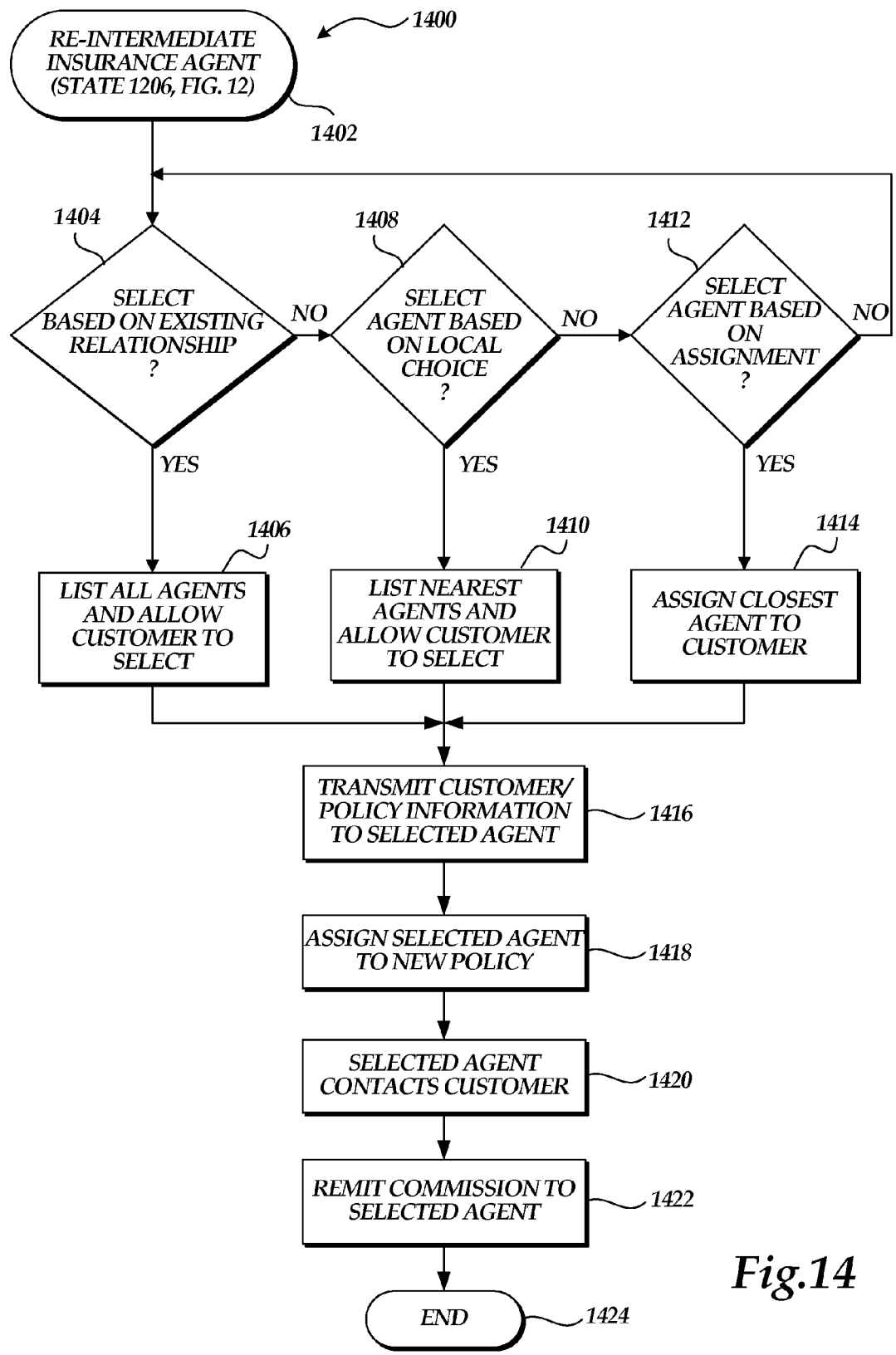

METHOD AND SYSTEM FOR PROVIDING INSURANCE POLICIES VIA A DISTRIBUTED COMPUTING NETWORK

FIELD OF THE INVENTION

This invention generally relates to the field of distributed computer systems and, more specifically, relates to a method and system for providing insurance policies via a distributed computing network, such as the Internet.

BACKGROUND OF THE INVENTION

With the advent and explosion of the Internet and the World Wide Web ("Web" or "WWW"), a large number of Internet Web sites have become available through which consumers can purchase a wide variety of goods and services. For instance, Internet Web sites are currently available at which consumers can purchase home appliances, furniture, compact disks, video tapes, and virtually every other available product. Similarly, Internet Web sites are currently available at which consumers can avail themselves of services, such as apartment finding services, home grocery delivery services, and a plethora of other types of services.

Web sites have also been created for providing legal, financial, and insurance products. For instance, Web sites are currently available that provide services related to the insurance industry, like for receiving a premium quotation for an insurance policy. While Web sites have been created that provide some level of insurance information, all of the current insurance-related Web sites suffer from a number of serious drawbacks.

The main drawback of current Internet Web sites providing insurance information is that these Web sites do not completely re-intermediate insurance agents into the on-line sales process. Traditionally, insurance policies have been sold through insurance agents. Insurance agents may be employed by an insurance company, or they may operate independently. Insurance companies have traditionally relied on insurance agents to be a first point of contact with customers and to provide extra value to the insurance policies provided by the insurance companies. However, current Internet Web sites that provide insurance products sell insurance policies directly to the consumer. These Web sites may pay a commission to an agent for the sale, but the insurance companies that operate such sites retain control over the customer's account and do not release this control to the selling agent.

Paying insurance agents a commission for an on-line sale of an insurance policy without releasing control of the customer's account to the agent may be a wise short-term strategy for an insurance company. However, in the long-term, this strategy may have many drawbacks. For instance, customers may not receive the level of personalized service and value they once received, because the insurance agent may be unmotivated to provide additional service if they will not receive an additional commission. For these and other reasons, selling insurance policies directly to consumers through an Internet Web site without completely re-intermediating the insurance agent by providing complete control over the customer to the agent may not be an effective business model.

Another drawback of current Internet Web sites providing insurance information is that the current sites do not provide bindable insurance quotations. If a customer receives a premium quotation from one of the current sites, typically they must receive paperwork in the mail from the insurance company before the policy is actually binding to the insurance company. For consumers, this means that they may have to wait to get a meaningful binding quotation, and therefore, that the quotation provided at the Web site cannot be relied upon contractually. A further drawback of current Internet Web sites providing insurance information is in the delivery of the actual insurance policies. Current insurance Web sites deliver insurance policies and accompanying documentation in a paper form. This also requires customers to wait for delivery of the paper insurance policy in the mail.

Accordingly, in light of the above problems, there is a need for a method and system for providing insurance policies via a computing network that re-intermediates insurance agents into the policy sales and service process. There is a further need for a method and system for providing insurance policies that provides an immediate bindable insurance policy premium quotation to the consumer. Furthermore, there is a need for a method and system for providing insurance policies that provides insurance policies and any accompanying documentation in an electronic format.

SUMMARY OF THE INVENTION

The present invention solves the above problems by providing a method and system for providing insurance policies via a distributed computing network that re-intermediates insurance agents into the on-line policy sales process. Additionally, the present invention provides a method and system for providing insurance policies via a distributed computing network that can advantageously provide a bindable insurance quotation to a potential insurance customer. Furthermore, the present invention advantageously provides a method and system for providing insurance policies via a distributed computing network that can deliver insurance policies in a convenient electronic format.

Generally described, the present invention provides a method and system for re-intermediating an insurance agent into an on-line insurance policy sales system. According to an embodiment of the present invention, a virtual insurance producer Web site is provided at which a prospective insurance customer may request a bindable premium quotation for an insurance policy. In order to receive the bindable premium quotation, the prospective customer may be asked to provide information relating to the insurability of an individual to be insured by the insurance policy. For instance, the prospective customer may be asked to provide information regarding the individual's address, age, marital status, etc. The prospective customer may also be prompted to provide information relating to the coverage to be provided by the insurance policy, such as the type of coverage required, policy limits, etc.

Once the information relating to the insurability of the individual and the coverage to be provided has been received, the virtual insurance producer Web site is operative to request underwriting information regarding the individual from one or more outside information resources. For instance, the Web site may request a driving record or credit report for the individual from an external vendor of such information. Using the information provided by the prospective customer and the underwriting information received from the external data vendors, the virtual insurance producer Web site determines whether the requested insurance policy may be underwritten. If the policy may be underwritten, the Web site also calculates a premium for the insurance policy. The Web site may utilize external software modules to make the underwriting decision and to calculate the premium. Once the premium has been calculated, the premium is displayed to the prospective customer as a bindable quotation that binds the insurance company providing the policy and that may be purchased on-line immediately.

According to an embodiment of the present invention, the prospective customer may purchase the insurance policy according to the provided bindable premium quotation through the virtual insurance producer Web site. If the prospective customer elects to purchase the policy, the virtual insurance producer Web site may re-intermediate an insurance agent into the sales process. According to an embodiment of the present invention, the insurance agent may be re-intermediated by first providing a list of available insurance agents to the prospective customer. The prospective customer may select one of the insurance agents from the list. Once an agent has been selected, complete control of the customer and their account is transferred from the Web site to the selected agent. To accomplish this, information regarding the prospective customer and the insurance policy is transmitted to the insurance agent. Using this information, the insurance agent may make direct contact with the customer and provide value-added service to them. Additionally, a commission is paid to the insurance agent for their services.

According to another embodiment of the present invention, the list of insurance agents provided to the prospective customer may be compiled based upon geographical distance between the agents and the customer. For instance, the insurance agents closest to the purchaser's home may be identified and displayed. Similarly, the customer may indicate that the insurance agent geographically closest to their address should be assigned to service their policy. Once an insurance agent has been re-intermediated in this manner, the insurance policy and any accompanying documents may be delivered to the customer in an electronic form.

According to yet another embodiment of the present invention, the virtual producer Web site may make an interactive help system available to the prospective customer throughout the insurance policy purchasing process. The interactive help system may include an interactive chat facility for providing real-time communication between the customer and an insurance help-desk representative. Using such a chat facility, the help-desk representative may assist the customer throughout the purchasing process. Additionally, the interactive help system may also include facilities for transmitting e-mail messages between the customer and an insurance help-desk representative, and a facility for making a request to be contacted by a help-desk representative via telephone.

The present invention also provides a method, apparatus, system, and computer-readable medium for providing insurance policies via a distributed computing network.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 5 is a block diagram illustrating a computer architecture for a Web server computer utilized in an actual embodiment of the present invention.

FIGS. 7A-7C are screen diagrams illustrating a portion of an Internet Web site for receiving information regarding an individual to be insured according to an actual embodiment of the present invention.

FIG. 14 is a flow diagram illustrating a method for re-intermediating an insurance agent according to an actual embodiment of the present invention.

DETAILED DESCRIPTION OF THE PREFERRED EMBODIMENT

Figure 1:
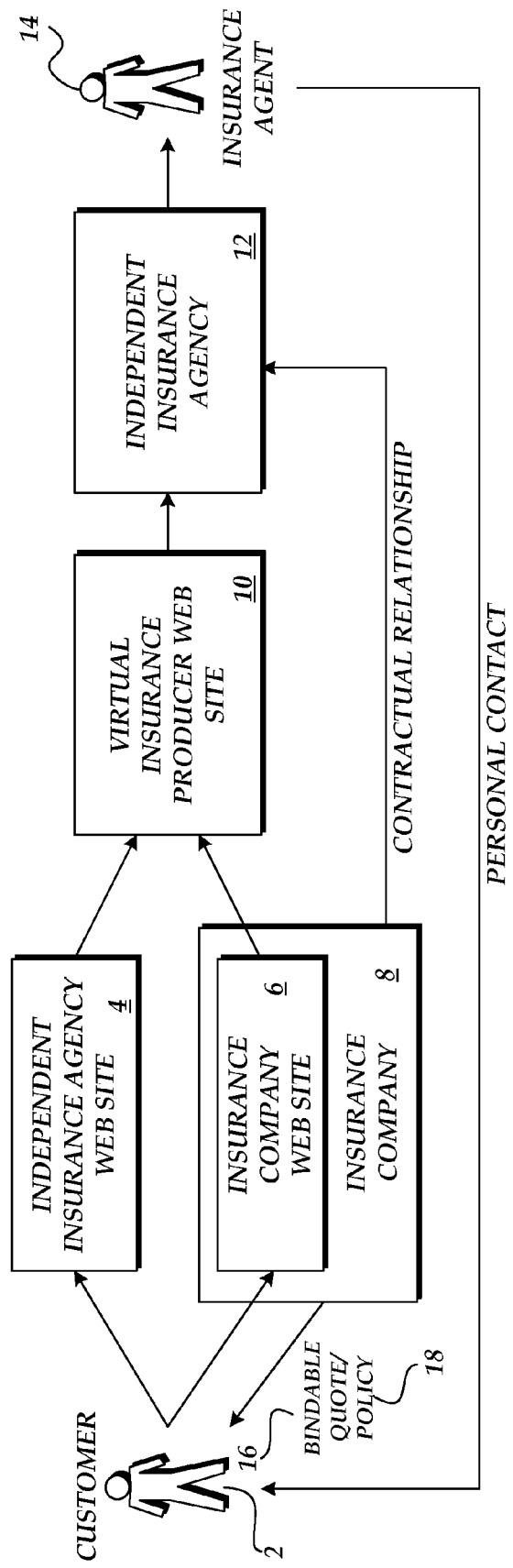
FIG. 1 is a block diagram illustrating a method and system for providing an insurance policy according to an actual embodiment of the present invention.

The present invention is directed toward a method and system for providing insurance policies via a distributed computing network, such as the Internet. Referring now to the figures, in which like numerals represent like elements, an actual embodiment of the present invention will be described. FIG. 1 illustrates an actual embodiment of the present invention for providing insurance policies via a distributed computing network. According to this embodiment of the invention, a virtual insurance producer Web site 10 is provided that embodies aspects of the invention for providing insurance policies to customers, such as the customer 2, that visit the virtual insurance producer Web site 10 using a standard personal computer executing a Web browser application program. In order to reach the virtual insurance producer Web site 10, the customer 2 may first visit another Web site such as the independent insurance agency Web site 4, provided by the independent insurance agency 12, or the insurance company Web site 6, provided by the insurance company 8.

As will be described in more detail below, once the customer 2 has arrived at the virtual insurance producer Web site 10, the customer 2 may make a request to receive a bindable premium quotation for an insurance policy. A bindable premium quotation is a quotation of a premium for an insurance policy that may be purchased immediately by the customer 2. If the customer 2 makes such a request, the virtual insurance producer Web site 10 may receive information from the customer 2 necessary to determine whether the insurance policy requested by the customer 2 may be underwritten. In an embodiment of the invention, the virtual insurance producer Web site 10 is operative to provide automobile insurance. In this embodiment, the virtual insurance producer Web site 10 may receive information from the customer 2 relating to the insurability of an individual to be insured and information relating to the coverage to be provided by the insurance policy. For instance, the virtual insurance producer Web site 10 may receive information relating to the length of time the individual has lived at their current address, the individual's home address, and the type and amount of coverage desired.

Based upon the information provided by the customer 2, the virtual insurance producer Web site 10 may gather underwriting information from one or more outside information vendors. Underwriting information comprises data that may assist in the determination of whether the policy may be underwritten. For instance, the virtual insurance producer Web site 10 may request an electronic credit report for the individual from a provider of such data. Once the underwriting information has been obtained from the outside information vendors, the virtual insurance producer Web site 10 may determine whether the insurance policy may be underwritten for the individual. If the policy may be underwritten, the virtual insurance producer Web site 10 may calculate a premium for the insurance policy and provide the premium to the customer 2 as a bindable quotation 16. The customer 2 may then request to purchase the insurance policy according to the provided quotation 16 immediately.

If the customer 2 elects to purchase the insurance policy, the insurance policy 18 may be provided to the customer 2 in an electronic format. Additionally, an insurance agent 14 may be re-intermediated into the on-line insurance sales process by the virtual insurance producer Web site 10. According to an embodiment of the present invention, the insurance agent 14 is re-intermediated by assigning the insurance agent 14 to the insurance policy 18 and the customer 2. By assigning the insurance agent 14 to the customer 2, the insurance agent 14 can provide personalized service to the customer 2. In exchange for this service, the insurance agent 14 may be paid a commission. Additional details regarding the re-intermediation of the insurance agent 14 are provided below.

According to an embodiment of the present invention, the independent insurance agency 12 and the insurance agent 14 may have a contractual relationship to facilitate the re-intermediation of the insurance agent 14. According to this contractual relationship, the independent insurance agency 12 may be required to provide an independent insurance agency Web site 4. Additionally, the contract may require that potential insurance customers be routed from the independent insurance agency Web site 4 to the virtual insurance producer Web site 10. Moreover, the insurance agent 14 may be required to personally contact the customer 2 when the customer 2 is assigned to the insurance agent 14. According to the contract, the independent insurance agency 12 and the insurance agent 14 are paid a commission in exchange for contacting the customer and providing the independent insurance agency Web site 4. Additional contractual requirements may also be included as known to those skilled in the art. With this general description of an actual embodiment of the present invention as a backdrop, additional aspects of the present invention will be described.

Illustrative Operating Environment

Figure 2:
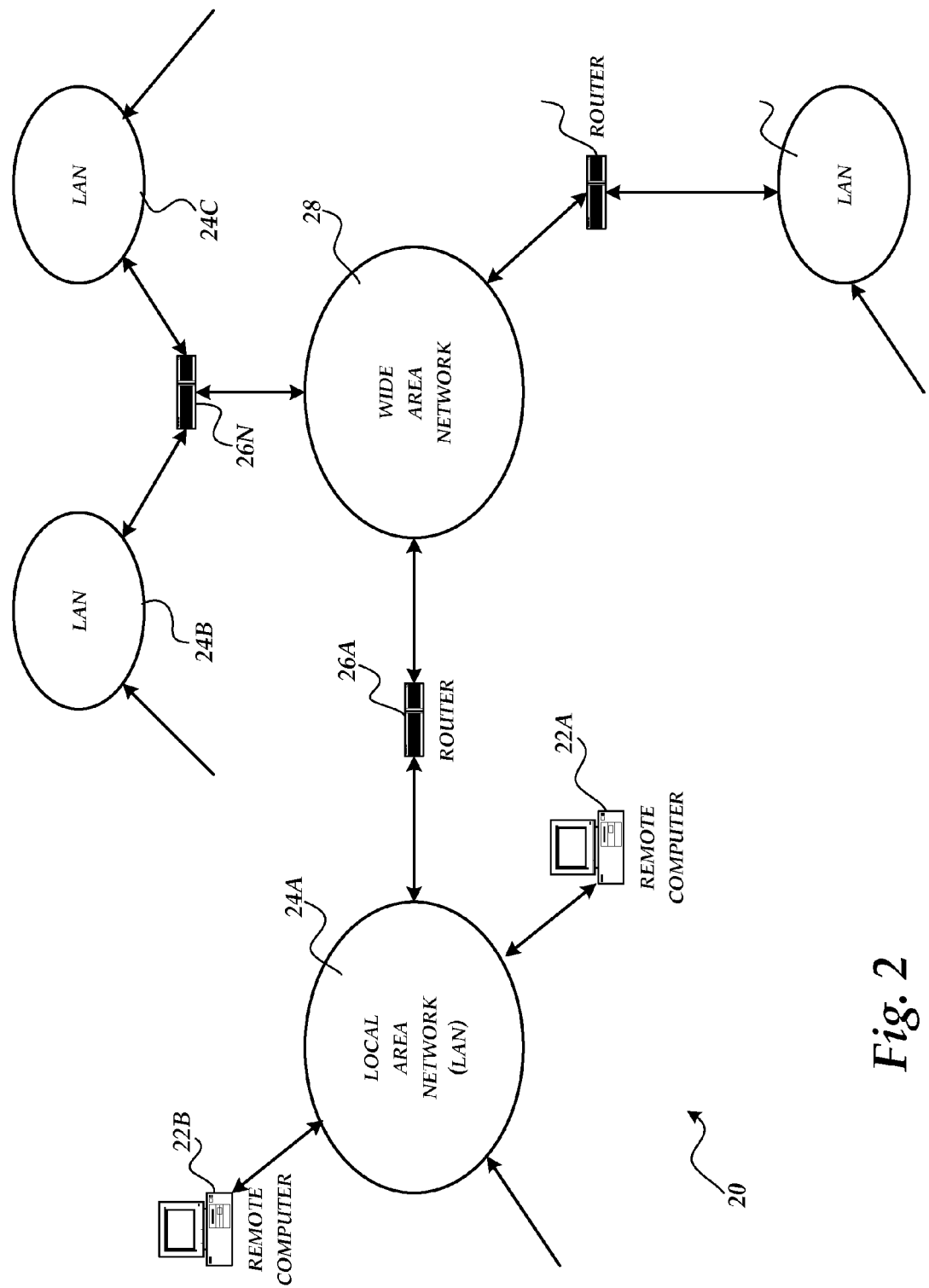
FIG. 2 is a block diagram showing an illustrative operating environment for aspects of the present invention.

As briefly described above, aspects of the present invention are embodied in a WWW site and other system components accessible through, and utilizing, the Internet. As is well known to those skilled in the art, the term "Internet" refers to the collection of networks and routers that use the Transmission Control Protocol/Internet Protocol ("TCP/IP") to communicate with one another. A representative section of the Internet 20 is shown in FIG. 2, in which a plurality of local area networks ("LANs") 24A-24N and a wide area network ("WAN") 28 are interconnected by routers 26A-26N. The routers 26A-26N are special purpose computers used to interface one LAN or WAN to another. Communication links within the LANs may be twisted wire pair, or coaxial cable, while communication links between networks may utilize 56 Kbps analog telephone lines, 1 Mbps digital T-1 lines, 45 Mbps T-3 lines or other communications links known to those skilled in the art. Furthermore, computers, such as remote computer 22A, and other related electronic devices can be remotely connected to either the LANs 24A-24N or the WAN 28 via a modem and temporary telephone link. It will be appreciated that the Internet 20 comprises a vast number of such interconnected networks, computers, and routers and that only a small, representative section of the Internet 20 is shown in FIG. 2.

The Internet 20 has recently seen explosive growth by virtue of its ability to link computers located throughout the world. As the Internet has grown, so has the WWW. As is appreciated by those skilled in the art, the WWW is a vast collection of interconnected or "hypertext" documents written in HyperText Markup Language ("HTML"), or other markup languages, that are electronically stored at "WWW sites" throughout the Internet. A WWW site is a server computer connected to the Internet that has mass storage facilities for storing hypertext documents and that runs administrative software for handling requests for those stored hypertext documents. A hypertext document normally includes a number of hyperlinks, i.e., highlighted portions of text which link the document to another hypertext document possibly stored at a WWW site elsewhere on the Internet. Each hyperlink is associated with a Uniform Resource Locator ("URL") that provides the exact location of the linked document on a server connected to the Internet and describes the document. Thus, whenever a hypertext document is retrieved from any WWW server, the document is considered to be retrieved from the WWW. As is known to those skilled in the art, a WWW server may also include facilities for storing and transmitting application programs; such as application programs written in the JAVA® programming language from Sun Microsystems, for execution on a remote computer. Likewise, a WWW server may also include facilities for executing scripts and other application programs on the WWW server itself.

A potential insurance customer or other remote user may retrieve hypertext documents from the WWW via a WWW browser application program. A WWW browser, such as Netscape's NAVIGATOR® or Microsoft's INTERNET EXPLORER®, is a software application program for providing a graphical user interface to the WWW. Upon request from the advertiser via the WWW browser, the WWW browser accesses and retrieves the desired hypertext document from the appropriate WWW server using the URL for the document and a protocol known as HyperText Transfer Protocol ("HTTP"). HTTP is a higher-level protocol than TCP/IP and is designed specifically for the requirements of the WWW. It is used on top of TCP/IP to transfer hypertext documents between servers and clients. The WWW browser may also retrieve application programs from the WWW server, such as JAVA applets, for execution on the client computer. The operation of a client computer for receiving and displaying hypertext documents and regarding the operation of a server computer for providing such documents is described in more detail below with reference to FIGS. 3-5.

Although aspects of the invention will be described in the general context of an application program that executes on an operating system in conjunction with a server computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. Although the invention is also described as being practiced in distributed computing environment, where tasks are performed by remote processing devices that are linked through a communications network, other possible implementations should be apparent to those skilled in the art.

Illustrative Embodiment of the Present Invention

Figure 3:
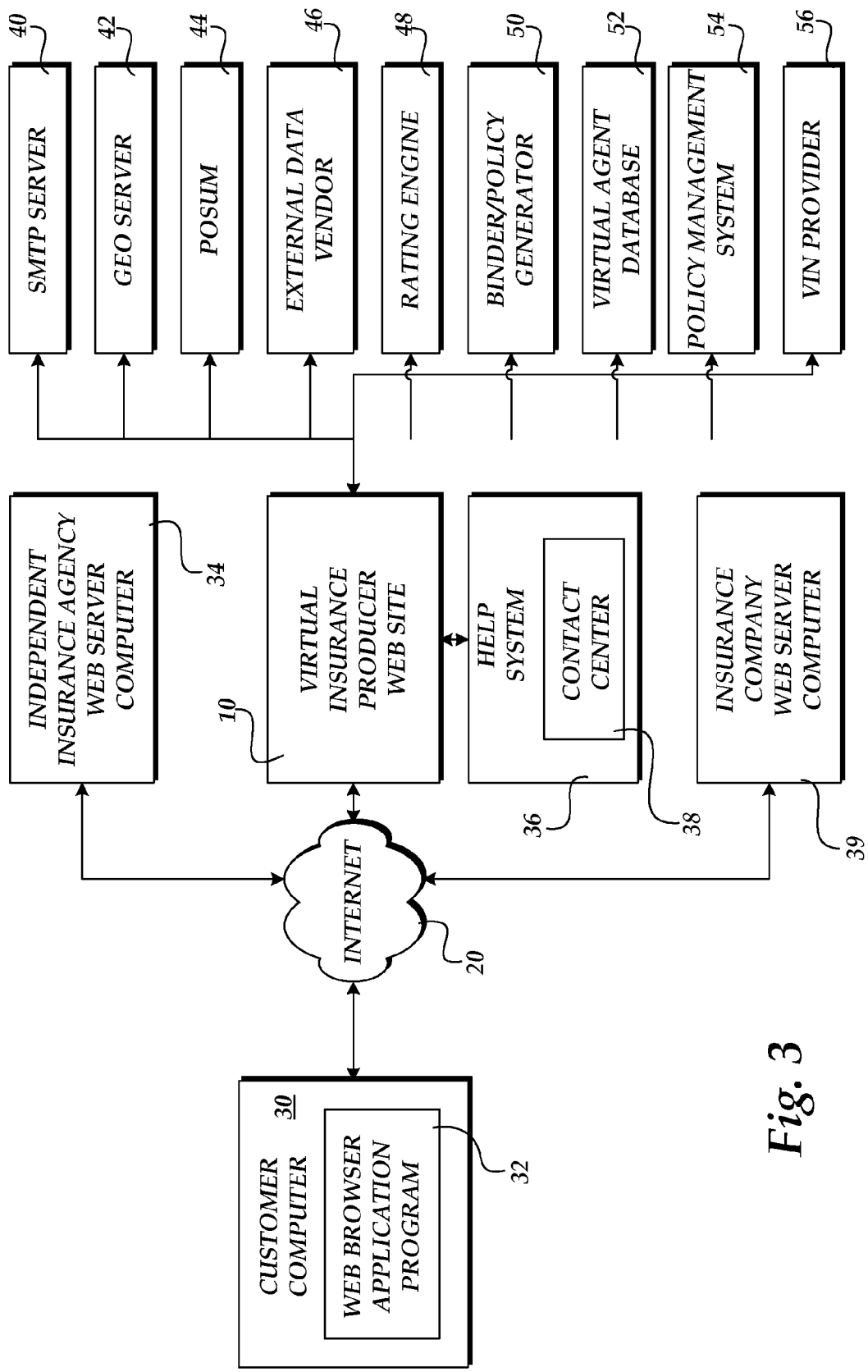
FIG. 3 is a block diagram illustrating a computer system architecture for an actual embodiment of the present invention.

Referring now to FIG. 3, an illustrative system for implementing the present invention will be described. According to an embodiment of the present invention, a customer computer 30 comprising a general purpose computer executing a Web browser application program 32 may be utilized by a potential insurance customer to connect to the Internet 20. The operation of an illustrative customer computer 30 is described in detail below with respect to FIG. 4.

Once the customer computer 30 has been connected to the Internet 20, a potential insurance customer may utilize the Web browser application program 32 to browse to a virtual insurance producer Web site 10 embodying aspects of the present invention. The potential insurance customer may be referred to the virtual insurance producer Web site 10 through another site, such as an insurance agency Web site provided by the independent insurance agency Web server computer 34. Likewise, the potential insurance customer may be referred to the virtual insurance producer Web site 10 through an insurance company Web site provided by the insurance company Web server computer 39.

The virtual insurance producer Web site 10 may be hosted and served by the insurance company Web server computer, or other computer connected to the Internet. As is described in more detail below with reference to FIGS. 6-14, the virtual insurance producer Web site 10 is operative to provide bindable insurance quotations to the potential insurance customer, to re-intermediate an insurance agent into the sales process, and to provide a purchased insurance policy to the customer in an electronic form. Moreover, the virtual insurance producer Web site 10 is operative to provide an interactive help system to the potential insurance customer throughout the quotation and purchase process.

To provide the described functionality, the insurance company Web server computer 39 and, in turn, the virtual insurance producer Web site 10, are operatively connected to a number of external systems and processes. Those skilled in the art should appreciate that while these systems and processes are illustrated in FIG. 3 as being separate from the virtual insurance producer Web site 10, these systems and processes may be executing on a machine local to the insurance company Web server computer 39 or even on the same machine.

One example of an external system utilized by the virtual insurance producer Web site 10 is the Simple Mail Transfer Protocol ("SMTP") server 40. The SMTP server 40 may be utilized by the virtual insurance producer Web site 10 to transmit and receive electronic mail messages to and from an insurance agent or the customer. Likewise, a "geo server" 42 may be utilized to identify latitude and longitude coordinates for a customer or agent address. As will be described in more detail below, these coordinates may be utilized by the virtual insurance producer Web site 10 to calculate the distance between a customer and an insurance agent, and to identify the agent closest to the customer.

The virtual insurance producer Web site 10 may also be operatively connected to one or more external data vendors 46. The external data vendors 46 may be queried by the virtual insurance producer Web site 10 to locate information relating to the insurability of the individual to be insured. For instance, a claims history report, credit report, driving record, or other similar information may be obtained through the external data vendor 46. An example of one such external data vendor is the Choicepoint Corporation of Alpharetta, Ga. The virtual insurance producer Web site 10 may also be operatively connected to a Vehicle Identification Number ("VIN") provider 56. The VIN provider 56 may respond to a request from the virtual insurance producer Web site 10 by providing a rating factor based upon the VIN of a vehicle to be insured. This rating factor may then be utilized when calculating the premium for the requested insurance policy. Alternately, a VIN database may be periodically downloaded from the VIN provider 56 and used off-line from the VIN provider 56.

The virtual insurance producer Web site 10 may also be connected to a Point of Sale Underwriting Module ("POSUM") 44. POSUM 44 is operative to receive a request from the virtual insurance producer Web site 10 including information about the individual to be insured. In response to this request, POSUM 44 evaluates factors which are predictive of risk to determine whether the insurance policy may be underwritten for the individual. In particular, quantitative values are assigned to these factors, and the values are added to produce a total POSUM score which indicates the risk associated with the individual to be insured. Similar methods for underwriting an insurance policy are well known to those skilled in the art.

Once the POSUM score is returned to the virtual insurance producer Web site 10, the score is transmitted to rating engine 48. The rating engine 48 is operative to take the POSUM score, the geographical location of the customer to be insured, and information relating to the requested insurance policy, and to return a premium for the policy. The premium is returned to the virtual insurance producer Web site 10 and displayed to the customer as a bindable premium insurance quotation.

If the customer chooses to purchase the policy, the virtual insurance producer Web site 10 may contact a binder/policy generator 50. The binder/policy generator 50 is operative to generate the insurance policy purchased by the individual and any accompanying documents. The insurance policy may be generated from previously stored form documents applicable to the state in which the customer is located. Additionally, the policy may be created in an electronic format, such as HTML, plain text, or a .pdf file viewable using the Acrobat® Reader from Adobe Corporation of Seattle, Wash. The policy and accompanying documents may be returned from the binder/policy generator 50 to the virtual insurance producer Web site 10 for transmission to the customer. The policy may be transmitted via a Web page, via e-mail through SMTP server 40, or through other means of electronic transmission.

The virtual insurance producer Web site 10 may also be connected to a virtual agent database 52 and a policy management system 54. The virtual insurance producer Web site 10 may utilize the virtual agent database 52 to store information regarding participating insurance agents and other information. Likewise, the policy management system 54 is operative to store information regarding insurance policies held by each customer, assigned agents, and accounting information, such as premiums, accounts receivable, and accounts payable, including calculating the portion of the received premium payable to insurance agents. Similarly, the virtual insurance producer Web site 10 may also be connected to a help system 36, including a contact center 38. The help system 36 is operative to provide an interactive help facility for use by a customer throughout the insurance application and purchasing process. The contact center 38 acts as a "virtual agent" in the event that a customer is unable to complete the application process and requires assistance. More detail regarding the help system 36 and contact center 38 is provided below with reference to FIG. 6.

Figure 4:
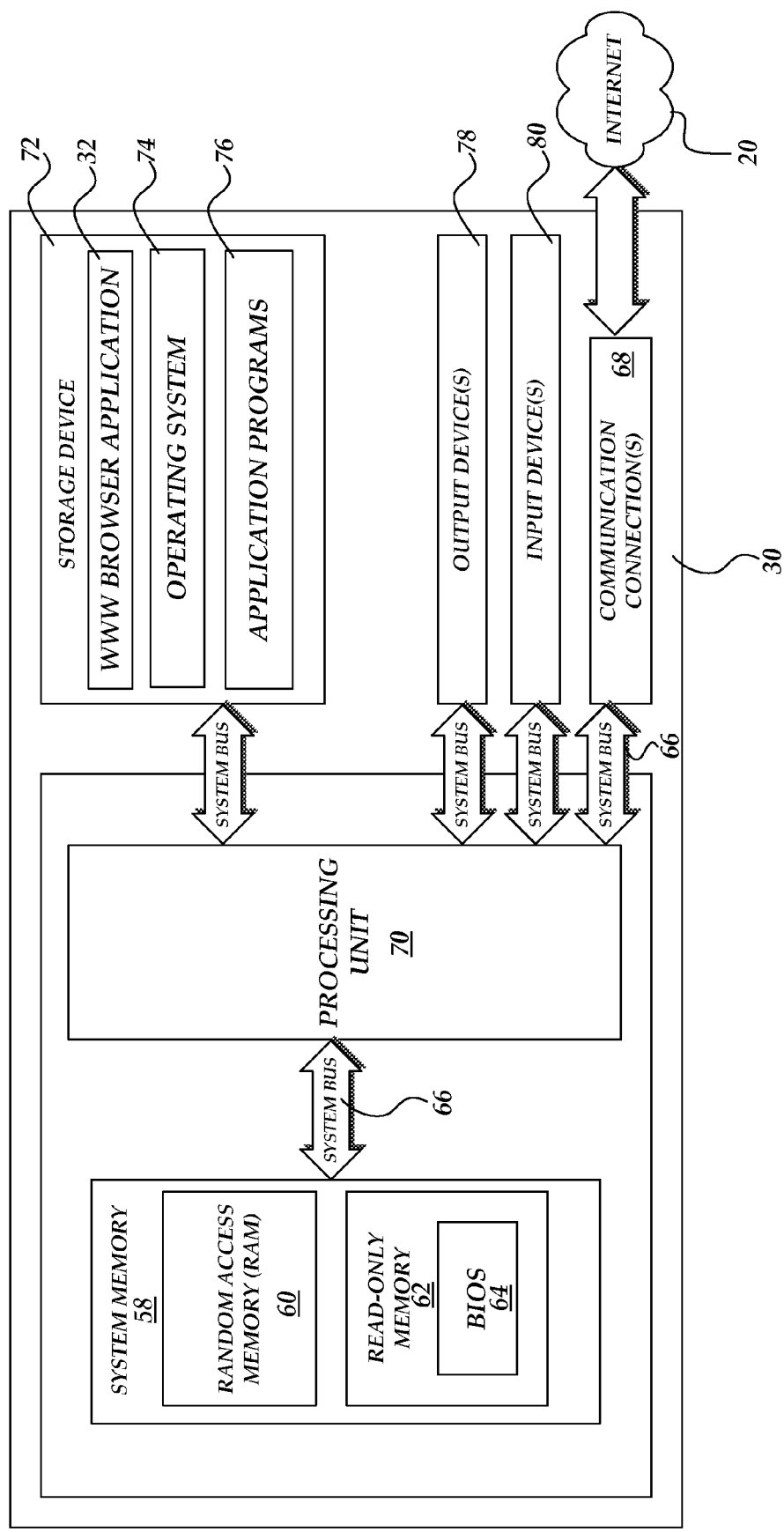
FIG. 4 is a block diagram illustrating a computer architecture for a customer computer utilized in an actual embodiment of the present invention.

Referring now to FIG. 4, an illustrative customer computer 30 will be described. As described briefly above, the customer computer 30 initiates a communications session with a server computer, such as virtual insurance producer Web site 10. Typically, the communications session is initiated in response to a request for a resource, like a WWW page, located at the virtual insurance producer Web site 10. The client computer 30 may make such a request through WWW browser application program 32, such as Microsoft® Internet Explorer. The WWW browser application program 32 may receive a resource from the virtual insurance producer Web site 10 and display the resource to the user of the customer computer 30.

The customer computer 30 comprises a conventional personal computer, including a processing unit 70, a system memory 58, and a system bus 66 that couples the system memory to the processing unit 70. The system memory 58 includes a read only memory ("ROM") 62 and a random access memory ("RAM") 60. A basic input/output system 64 ("BIOS"), containing the basic routines that help to transfer information between elements within the client computer 70, such as during start-up, is stored in ROM 62. The customer computer 30 may further include a storage device 72 such a hard disk drive, a magnetic disk drive, e.g., to read from or write to a removable disk, or an optical disk drive, e.g., for reading a CD-ROM disk or to read from or write to other optical media such as a Digital Versatile Disk ("DVD").

A number of program modules may be stored in the storage device 72 or in the RAM 60, including an operating system 74, one or more application programs 76, and a WWW browser application program 32, such as Internet Explorer provided by Microsoft® or Netscape Navigator provided by Netscape, Inc. As will be described in more detail below, the operator of the customer computer 30 may utilize the WWW browser application program 32 to view and interact with a WWW site provided according to an aspect of the invention.

A user of the customer computer 30 may enter commands and information into the customer computer 30 through input devices 80 such as a keyboard or a mouse. Other input devices (not shown) may include a microphone, touchpad, joystick, game pad, satellite dish, scanner, or the like. These and other input devices are often connected to the processing unit 70 through a serial port interface (not shown) that is coupled to the system bus 66, but may be connected by other interfaces, such as a game port or a universal serial bus ("USB"). Output devices 78 may include a monitor or other type of display device. Such output devices may be connected to the processing unit 70 through the system bus 66 and one or more interface adapters. In addition to a monitor, the customer computer 30 may include other peripheral output devices (not shown), such as speakers connected through an audio adapter, or a printer (not shown).

As described briefly above, the customer computer 30 may operate in a networked environment using logical connections to one or more remote computers, such as the insurance company Web server computer 39 (shown in FIG. 3). According to an embodiment of the invention, the customer computer 30 and the insurance company Web server computer 39 communicate over the Internet 20. The customer computer 30 connects to the Internet 20 through a communication connection 68 which may comprise a network interface connected to a LAN connected to the Internet, or a modem connected to the Internet through an Internet Service Provider ("ISP"). It will be appreciated that the network connections described here are illustrative and other means of establishing a communications link between the customer computer 30 and the insurance company Web server computer 39 may be used.

Referring now to FIG. 5, an illustrative insurance company Web server computer 39 will be described. As described briefly above, a communications session is initiated over the Internet 20 or other distributed computing network between the insurance company Web server computer 39 and the customer computer 30. Typically, the communications session is initiated in response to a request for a resource, like a Web page 100, located at the insurance company Web server computer 39. When such a communications session is initiated, the insurance company Web server computer 39 is operative to create and transmit to the customer computer 39 a Web site for providing insurance policies as described below with reference to FIG. 6-14.

The insurance company Web server computer 39 comprises a general purpose server computer for receiving and responding to HyperText Transfer Protocol ("HTTP") and Secure HTTP ("HTTPS") requests. The insurance company Web server computer 39 comprises a conventional server computer, including a processing unit 89, a system memory 82, and a system bus 90 that couples the system memory 82 to the processing unit 89. The system memory 82 includes a ROM 86 and a RAM 84. A BIOS 88, containing the basic routines that help to transfer information between elements within the insurance company Web server computer 39, such as during start-up, is stored in ROM 86. The insurance company Web server computer 39 further includes a storage device 94, such as a hard disk drive, for providing nonvolatile storage for the insurance company Web server computer 39.

In the actual embodiment of the present invention described herein, the insurance company Web server computer 39 operates in a networked environment. The insurance company Web server computer 39 communicates with the customer computer 30 over the Internet 20. The insurance company Web server computer 39 connects to the Internet 58 through a communications connection 110, such as a network interface card connected to the Internet 20 through a LAN. It will be appreciated that the network connections shown are illustrative and other means of establishing a communications link between the insurance company Web server computer 39 and the Internet 20 may be used.

A number of program modules may be stored in the storage device 94 and the RAM 84, including an operating system 98 suitable for controlling the operation of a server computer, such as Windows NT® or Windows® 2000 from Microsoft®. Additionally, a Web server application program 96 may be stored in RAM 84, like Internet Information Server from Microsoft®. As known to those skilled in the art, the Web server application program 96 is operative to receive HTTP requests through the communications connection 110, and to respond to those requests. Typically, an HTTP request will take the form of a request for a page encoded in the Hypertext Markup Language ("HTML"), a graphics file, or another application program stored at the insurance company Web server computer 39. Scripts 102, JAVA® servlets 104, and other types of server-side programming facilities may be utilized to dynamically generate Web pages, communicate with other computers connected to the Internet, or perform other functions known to those skilled in the art. The operation of the insurance company Web server computer 39 in this regard will be described in more detail below with reference to FIGS. 6-14.

Figure 6A:
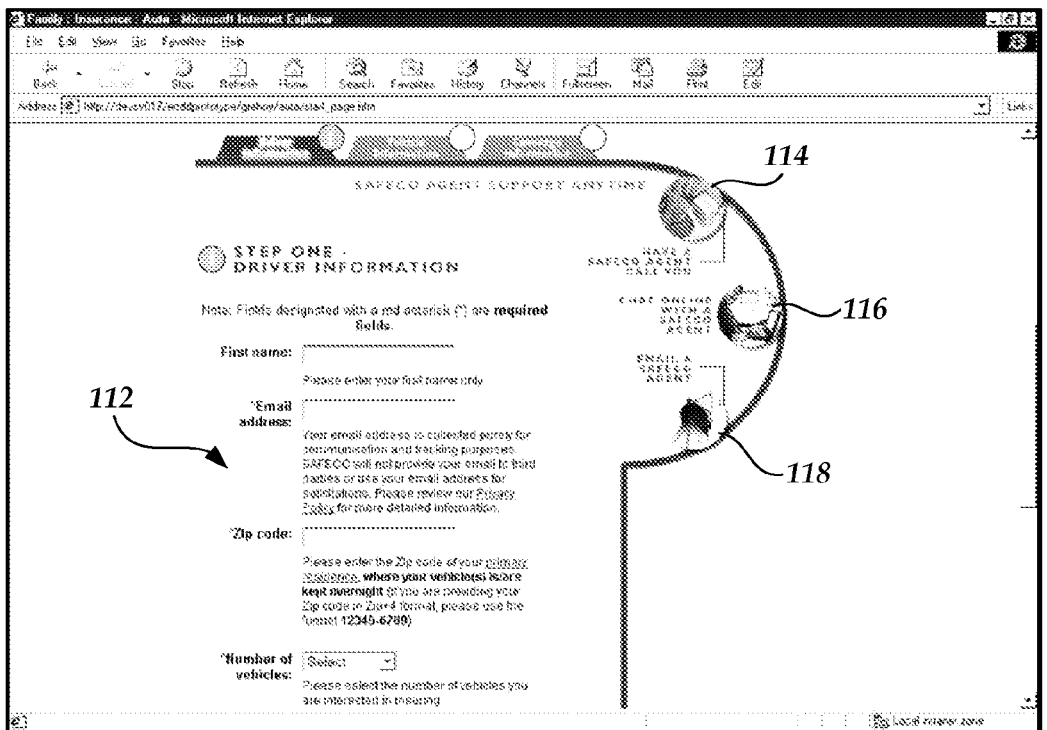
FIGS. 6A and 6B are screen diagrams illustrating a portion of an Internet Web site for receiving basic customer information according to an actual embodiment of the present invention.
Figure 6B:
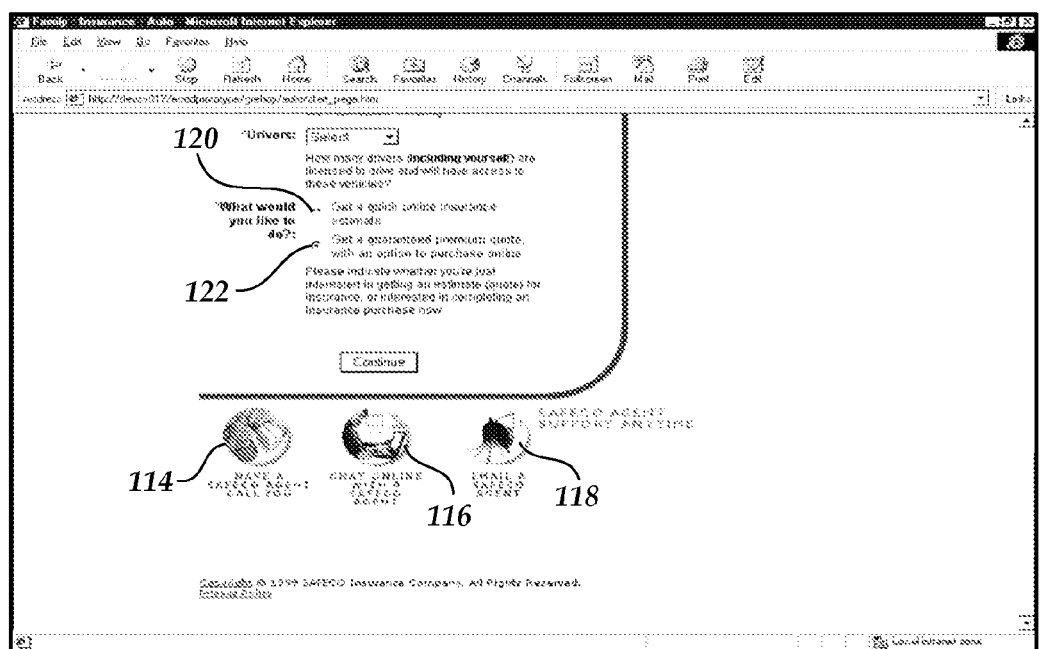

Referring now to FIGS. 6A and 6B, an illustrative Internet Web site provided by the virtual insurance producer Web site 10 will be described. As mentioned briefly above, the actual embodiment described herein is for providing automotive insurance policies. However, those skilled in the art should appreciate that the concepts embodied herein are applicable to other types of insurance and may be applied to other types of insurance without departing from the spirit and scope of the invention.

When a potential insurance customer utilizes a Web browser application program 32 to browse to the Web site provided by the present invention, the customer will be presented with the screen display shown in FIGS. 6A and 6B. The screen display requests that the customer fill in a form to provide basic customer information 112. This basic customer information 112 may comprise the customer's name, e-mail address, zip code, the number of vehicles to be insured, the number of drivers to be insured, or other information. While providing this information, and at any time during the application process, the customer may select the call button 114, the chat button 116, or the e-mail button 118 for assistance. These buttons connect the customer to the contact center 38 so that assistance may be rendered to the customer.

Figure 11A:
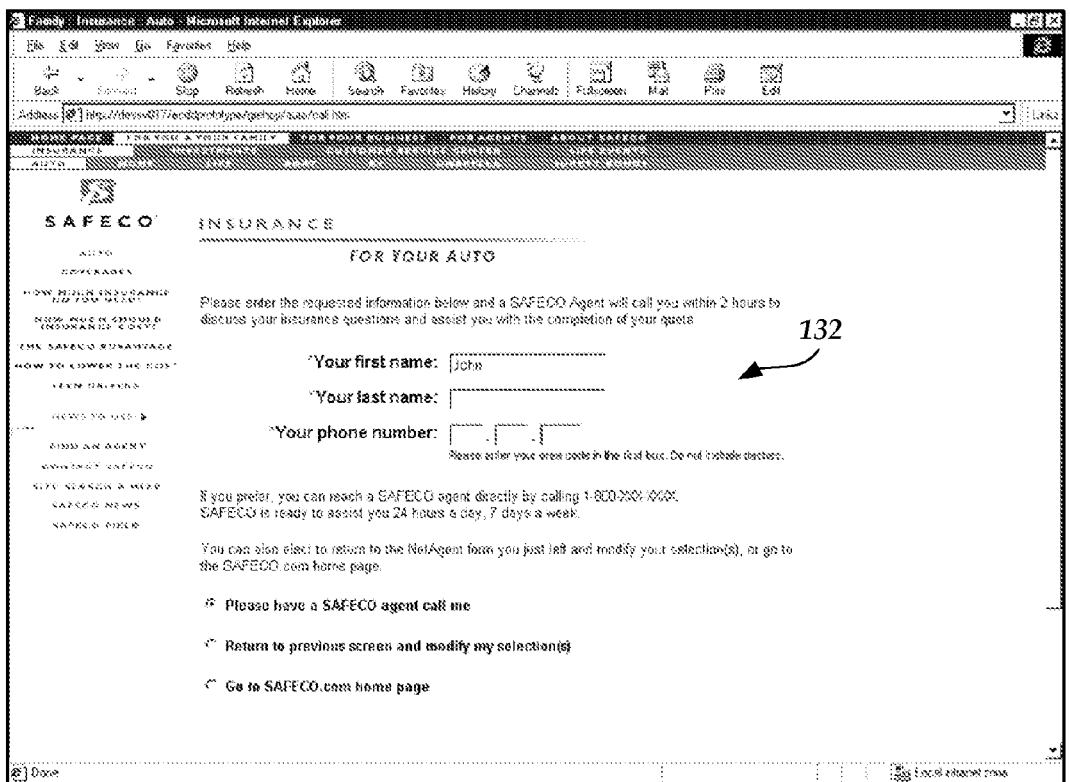
FIGS. 11A-11C are screen diagrams illustrating a portion of an Internet Web site for re-intermediating an insurance agent according to an actual embodiment of the present invention.

If the customer selects the call button 114, the customer may be asked to provide call contact information, such as a name and phone number (shown in FIG. 11A). A request may then be sent to the contact center 38 and, in particular, to an insurance help-desk representative, indicating that the customer would like to receive a telephone call for providing assistance. Likewise, if the customer selects the chat button 116, an interactive chat facility is provided to the customer allowing real-time communication between the customer and an insurance help-desk representative located at the contact center 38. Similarly, if the customer selects the e-mail button, an e-mail facility is provided to the customer through which an electronic mail message may be sent to an insurance help-desk representative. This help facility is available to the customer throughout the application and purchase process.

The customer may also be asked to choose between a quick insurance premium estimate or a bindable insurance quotation using the quick estimate button 120 or the bindable quotation button 122, respectively. If the customer selects the quick estimate button 120, the virtual insurance producer Web site 10 is operative to receive a minimal amount of information from the customer and provide a non-binding insurance quotation. If the customer selects the bindable quotation button 122, the virtual insurance producer Web site 10 is operative to provide a bindable insurance premium quotation to the customer as describe below with reference to FIGS. 7-11C.

Figure 7A:
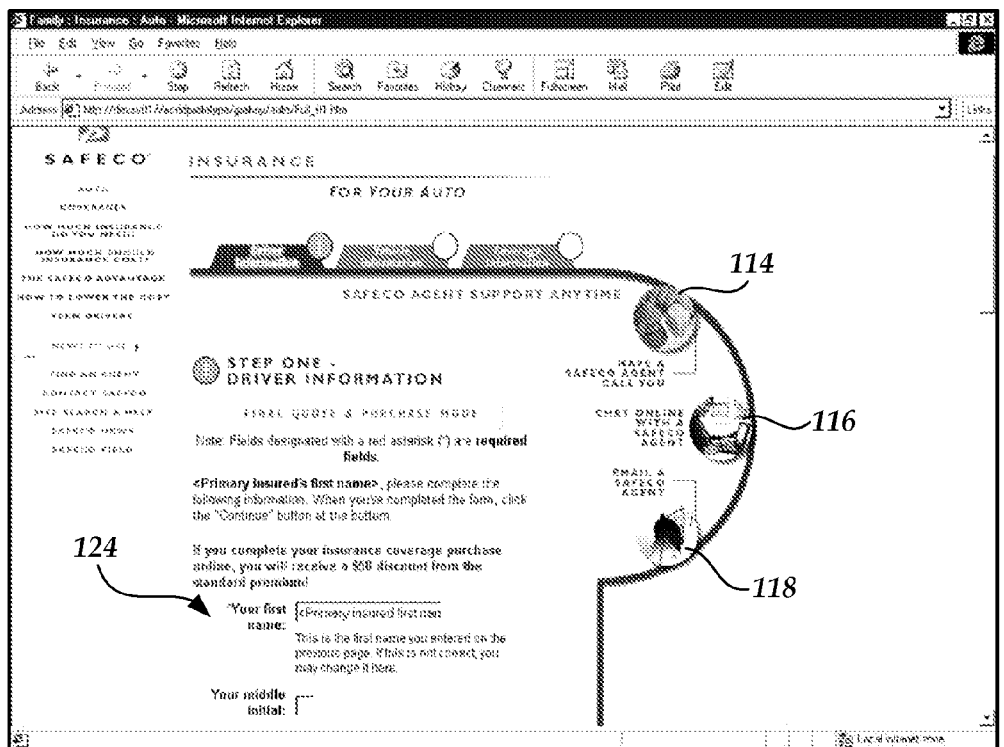
Figure 7B:
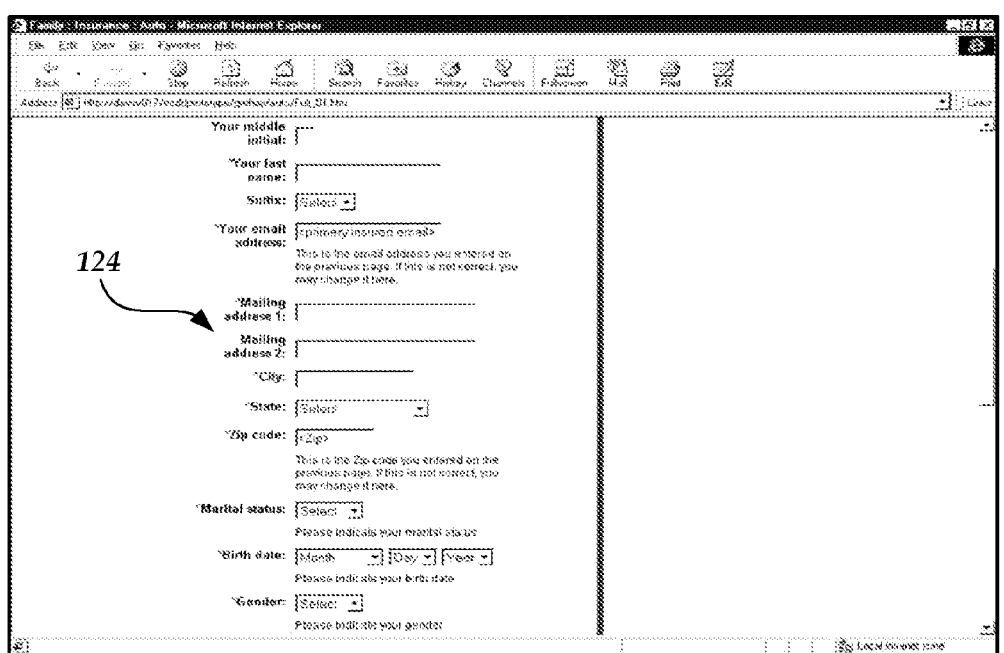
Figure 7C:
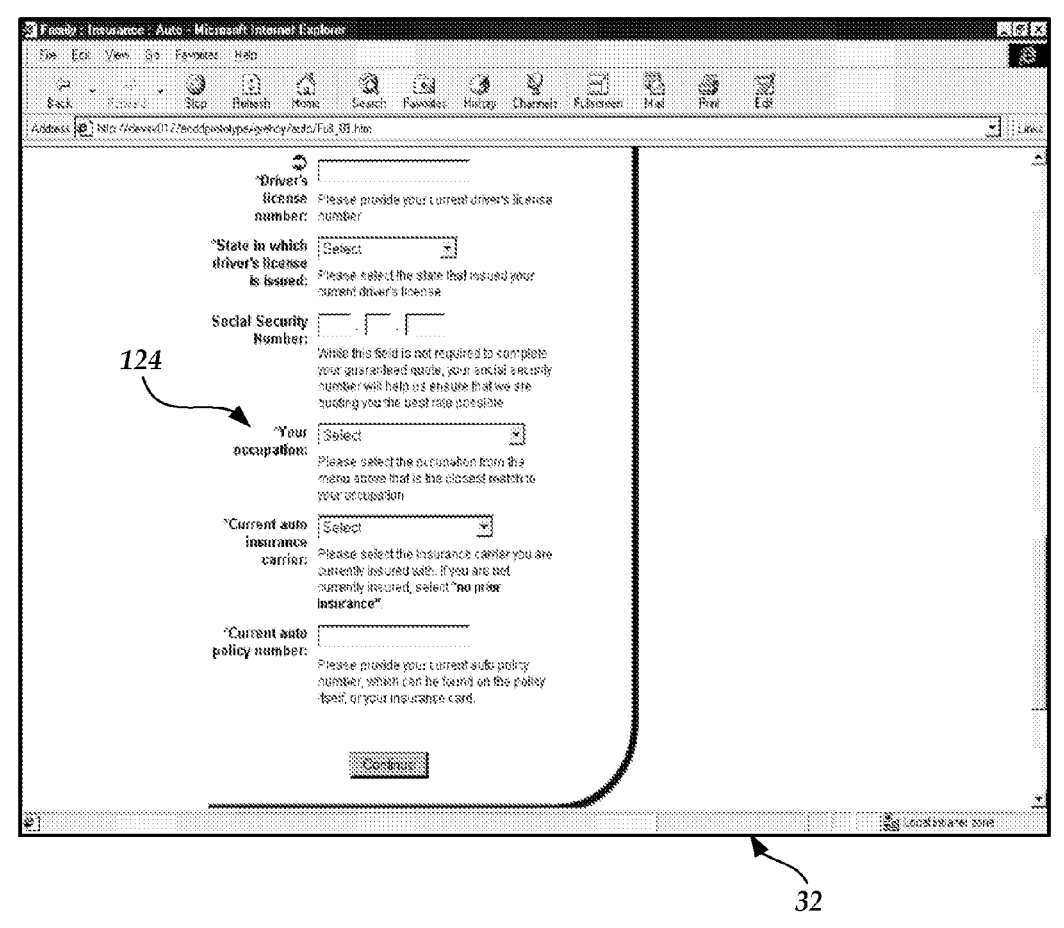

Referring now to FIGS. 7A, 7B, and 7C, illustrative screen displays of the Web browser application program 32 following the selection of the bindable quotation button 122 will be described. In FIGS. 7A, 7B, and 7C, a Web form is displayed for receiving information from the customer relating to the insurability of the individual to be insured. In the actual embodiment of the invention described herein, the customer is asked to provide driver information 124. Driver information may comprise the name, address, marital status, birth date, driver's license number and issuing state, social security number, occupation, and current insurance carrier and policy number for each individual to be insured. Those skilled in the art should appreciate that additional information relating to the individual to be insured also be requested.

Figure 8A:
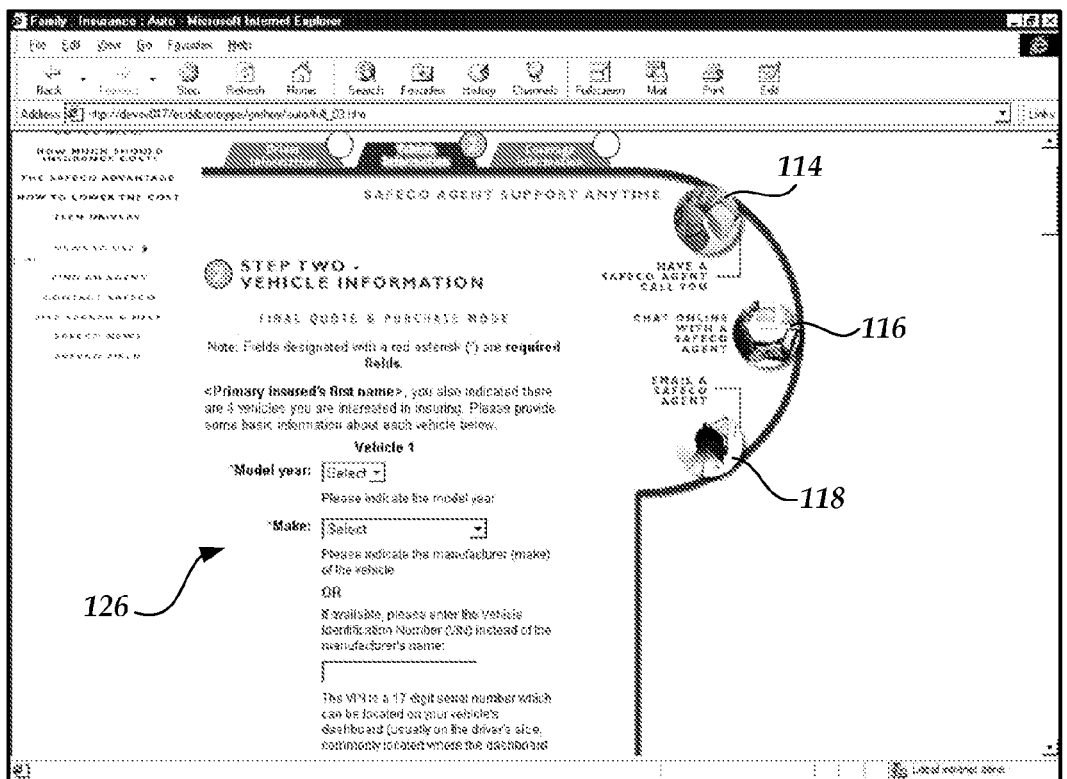
FIGS. 8A and 8B are screen diagrams illustrating a portion of an Internet Web site for receiving information regarding a vehicle to be insured according to an actual embodiment of the present invention.
Figure 8B:
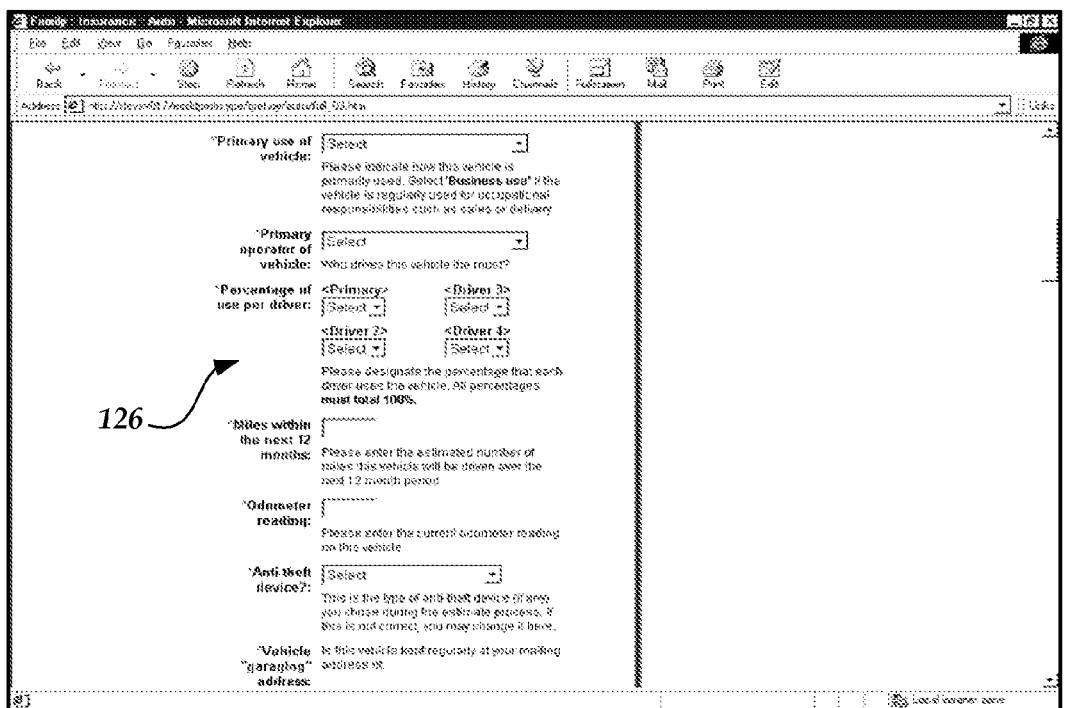

In FIGS. 8A and 8B, the customer is requested to provide information regarding the automobiles being insured. In other embodiments of the present invention, this information may relate to the boat, real property, or other needs being insured. In particular, the customer is required to provide vehicle information 126, such as the model year, make, primary use and operator of the vehicle, percentage of use per driver, miles driver per year, odometer reading, vehicle identification number, installed anti-theft devices, and garaging address for each vehicle to be insured. Other information regarding each vehicle to be insured may also be requested from the customer.

Figure 9A:
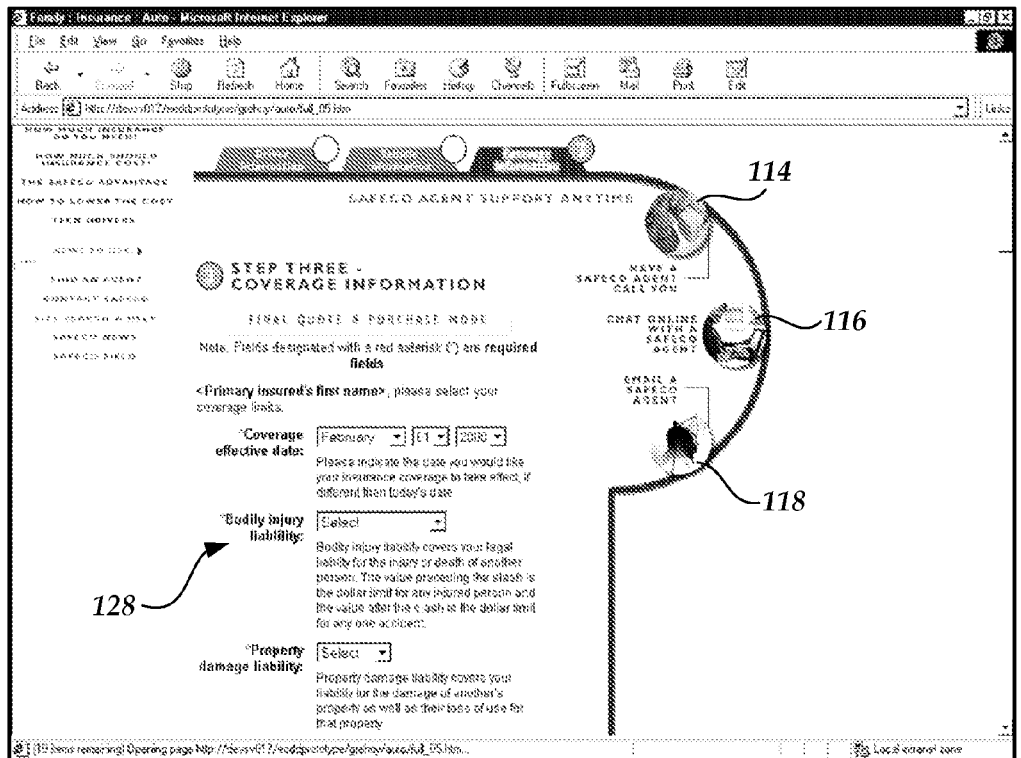
FIGS. 9A and 9B are screen diagrams illustrating a portion of an Internet Web site for receiving information regarding insurance policy coverage information according to an actual embodiment of the present invention.
Figure 9B:
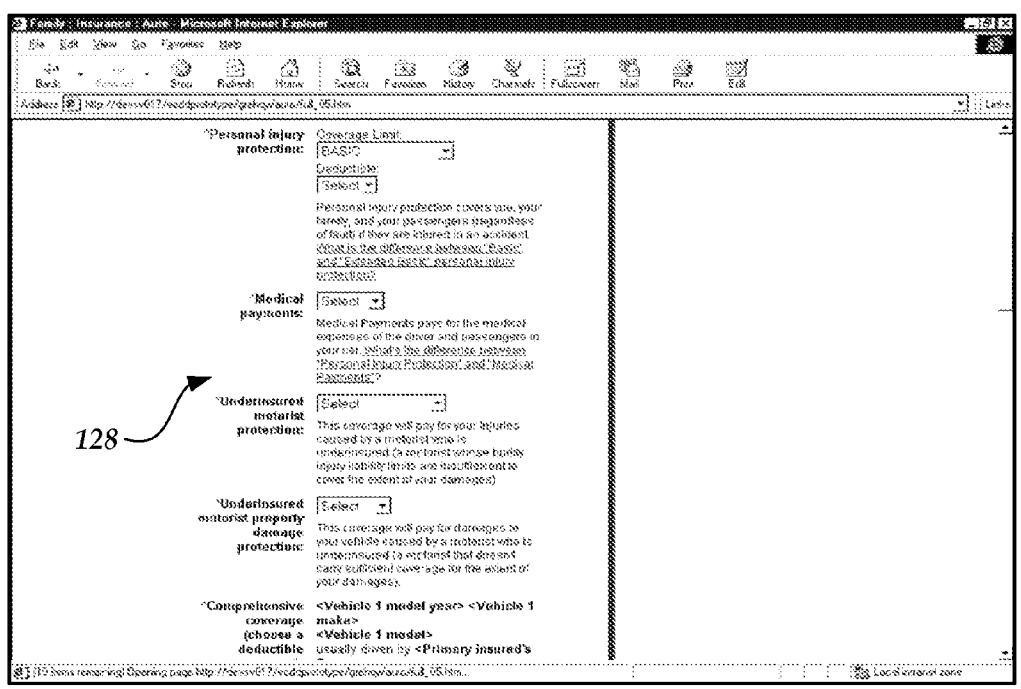

Referring now to FIGS. 9A and 9B, illustrative screen displays of the Web browser application program 32 for receiving information relating to the coverage to be provided by the requested insurance policy will be described. In FIGS. 9A and 9B a Web form is displayed for receiving information from the customer relating to the requested insurance policy. In particular, the customer is asked to provide coverage information 128, including the coverage effective date, the amount of bodily injury liability, property damage liability, personal injury protection, medical payments, uninsured motorist protection, and underinsured motorist property damage protection. Additionally, the customer may be required to identify a deductible for the policy. The customer may also be asked to provide additional information not shown in FIGS. 9A and 9B.

Figure 10A:
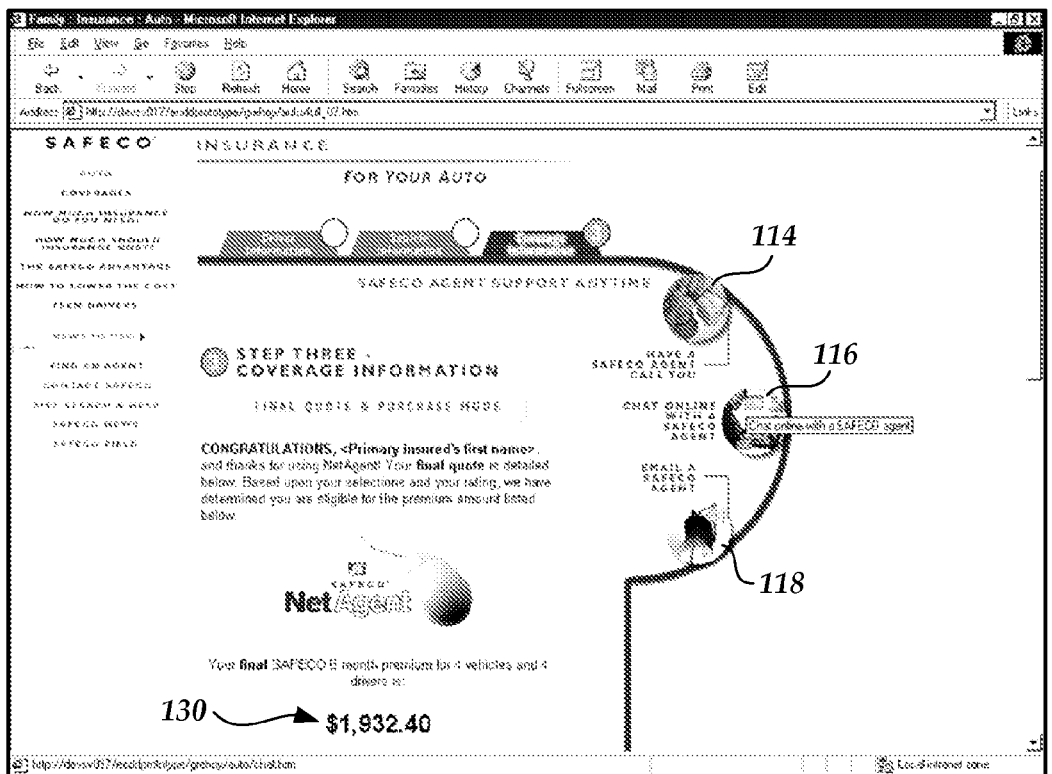
FIGS. 10A and 10B are screen diagrams illustrating a portion of an Internet Web site for providing a bindable quotation according to an actual embodiment of the present invention.
Figure 10B:
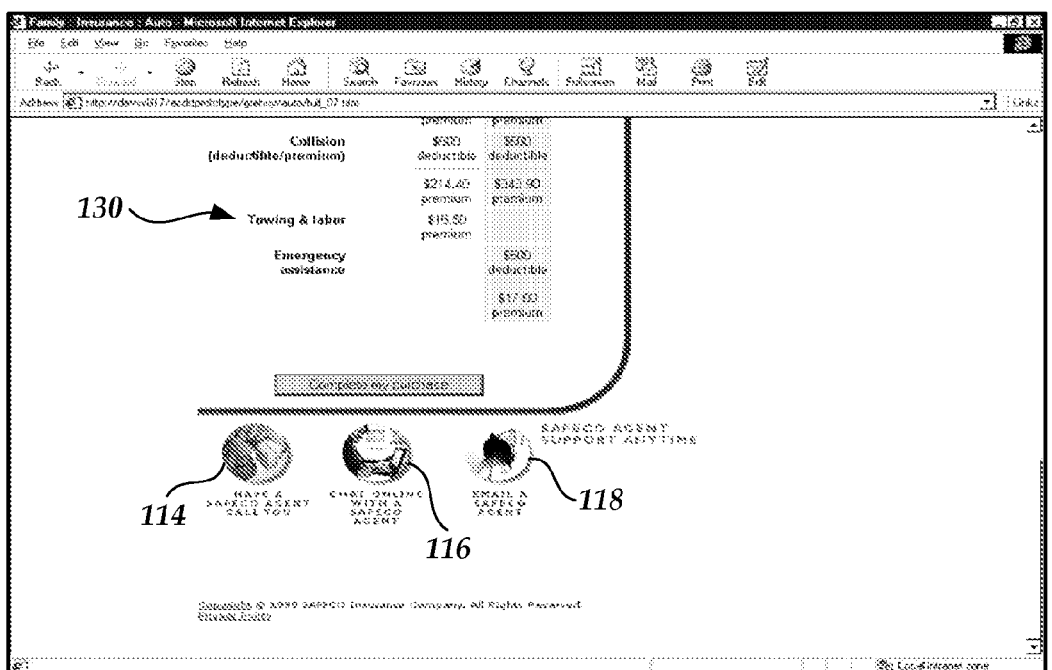

As described above, once the virtual insurance producer Web site 10 has received information from the customer regarding the individual to be insured and the requested coverage, data may be gathered from outside information sources, the policy underwritten, and a premium calculated for the individual. As shown in FIGS. 10A and 10B, the premium may then be displayed to the customer as a bindable insurance premium quotation 130. The bindable insurance premium quotation 130 may include a total premium and a detailed listing of the coverage provided under the policy. The customer then has the option of completing the purchase of the insurance policy. An illustrative routine for providing a bindable insurance quotation is provided below with respect to FIG. 13.

Figure 11B:
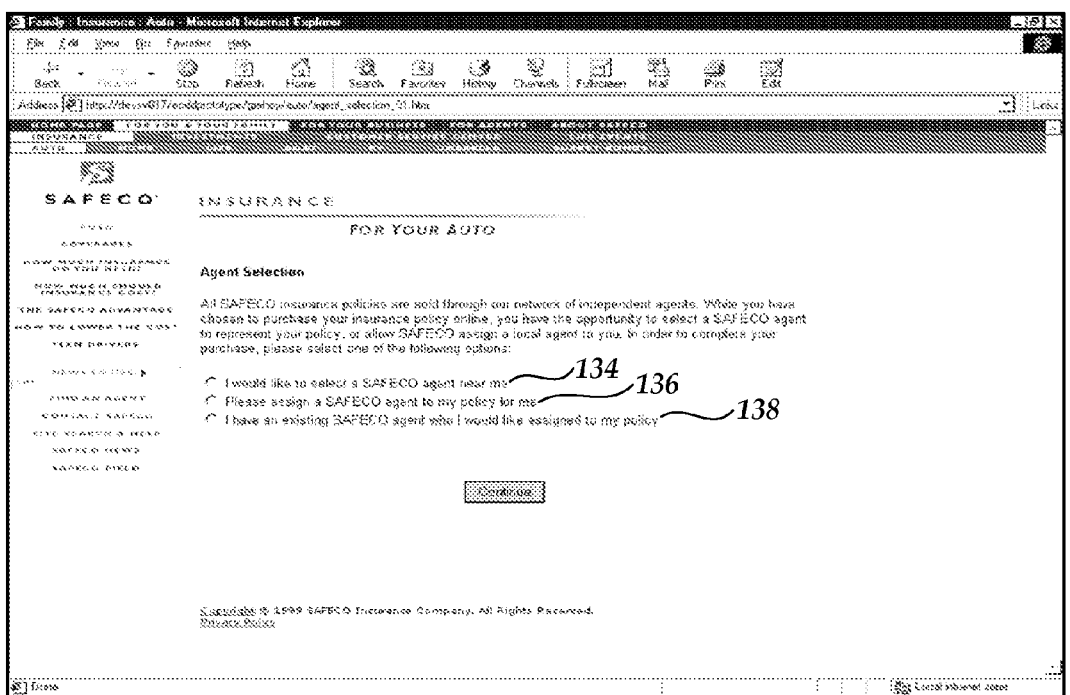
Figure 11C:
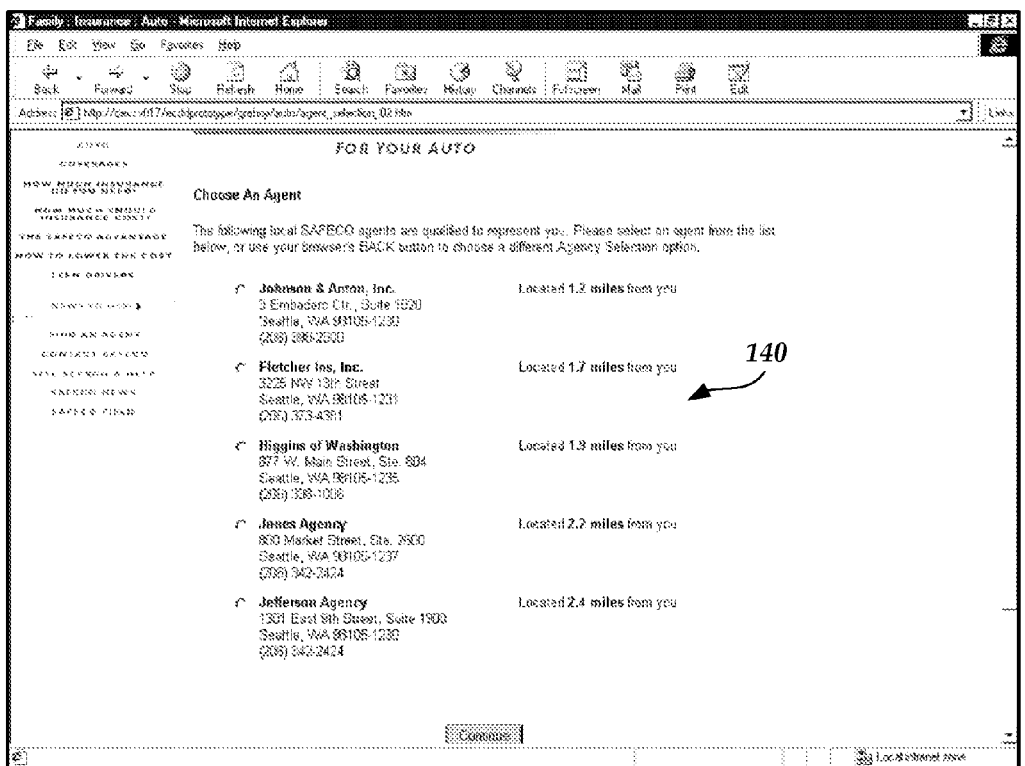

If the customer chooses to purchase the policy, the virtual insurance producer Web site 10 is operative to re-intermediate an insurance agent and to issue the insurance policy. As described briefly above, the binder and insurance policy may be generated by a binder/policy generator and transmitted to the customer electronically. In order to re-intermediate an insurance agent into the purchasing process, a screen display is provided to the customer as shown in FIG. 11B. At the screen shown in FIG. 11B, the customer is given the option of selecting the select agent button 134, the assign agent button 136, and the existing agent button 138. If the customer selects the select agent button 134, the customer is provided a list of insurance agents geographically proximate to the customer as shown in FIG. 11C. To determine the distance between the customer and the available agents, the geo server 42 may be consulted for latitude and longitude information as described above. The customer is then required to select one of the listed agents. The selected agent is then assigned to represent the insurance policy purchased by the customer and may be required to contact the customer directly. A commission may also be remitted to the agent.

If the customer selects the assign agent button 136, the insurance agent geographically closest to the customer will be assigned to the purchased insurance policy. If the customer selects the select agent button 134, the customer is permitted to browse a list of all available insurance agents to pick the agent of their choice. According to an embodiment of the invention, the selection of an insurance agent may be mandatory before the customer can complete the process. An illustrative routine for re-intermediating an insurance agent is described in detail below with respect to FIG. 14.

Figure 12:
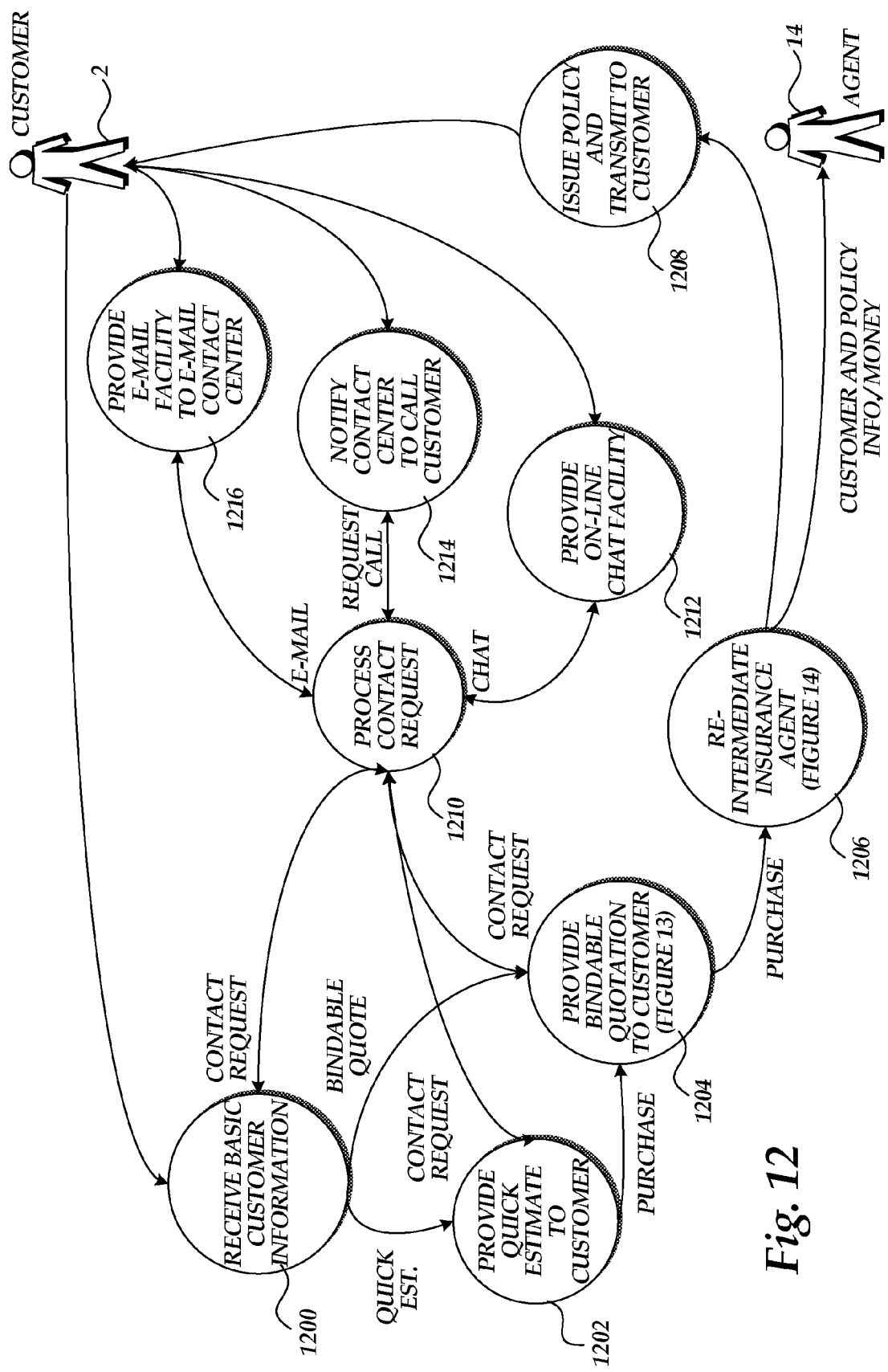
FIG. 12 is a state diagram illustrating a method for providing an insurance policy via a distributed computing network according to an embodiment of the present invention.

Referring now to FIG. 12, a state diagram showing an illustrative routine for providing an insurance policy will be described. According to the routine, basic customer information is received from the customer 2 at state 1200. A request is also received at state 1200 from the customer to receive either a quick insurance estimate or a bindable insurance premium quotation. If the customer requests a quick insurance estimate, the routine moves from state 1200 to state 1202, where a minimum amount of information is received from the customer to estimate an insurance premium. The estimated insurance premium is then provided to the customer. At state 1202, the customer may request to purchase the insurance policy for which a quick estimate was received.

If the customer makes a request to purchase the policy at state 1202, or if the customer requests a bindable insurance premium quotation at state 1200, the routine moves from to state 1204, where a bindable insurance premium quotation is provided. An illustrative Routine 1300 for providing a bindable insurance premium quotation is described below with reference to FIG. 13. At state 1204 the customer may also request to purchase the policy for which a bindable insurance premium quotation was provided. If the customer makes such a request, the routine moves to state 1206, where an insurance agent is re-intermediated into the insurance purchasing process. An illustrative Routine 1400 for re-intermediating an insurance agent is described in detail below with respect to FIG. 14.

Once an insurance agent has been re-intermediated at state 1206, information regarding the customer and the purchased policy are transmitted the agent 14. This information may be transmitted to the agent via e-mail or other method of electronic delivery. Additionally, a commission may also be remitted to the agent 14. The routine moves from state 1206 to state 1208, where the insurance policy is created and transmitted to the customer 2. As described above, the insurance policy may be created in HTML, plain text, or a .pdf file and delivered to the customer 2. Similarly, a hyper-text link may be provided to the company identifying a Web location at which the customer may view a Web page containing a viewable version of the policy. The insurance agent 14 may then contact the customer 2 directly to provide value-added service to the customer.

From either state 1200, 1202, or 1204, the customer may make a contact request. If the customer makes such a contact request, the routine moves to state 1210, where the contact request is processed. If the contact request is a request to e-mail the contact center for assistance, the routine moves to state 1216 where such a facility is provided.

If the contact request is a request to be contacted by a help-desk representative from the contact center, the routine moves from state 1210 to state 1214, where a name and phone number are received from the customer and a request is transmitted to the contact center. If the contact request is a request to chat on-line with a help desk representative, the routine moves from state 1210 to state 1212, where an interactive real-time chat facility is provided for enabling communication between the customer 2 and a help-desk representative located at the contact center. The help-desk representative may then assist the customer 2 through the application process. Alternatively, the customer 2 may be returned to the point in the application process where they left off once assistance has been provided to the customer by the contact center. The customer may then continue forward in the application process to completion.

Figure 13:
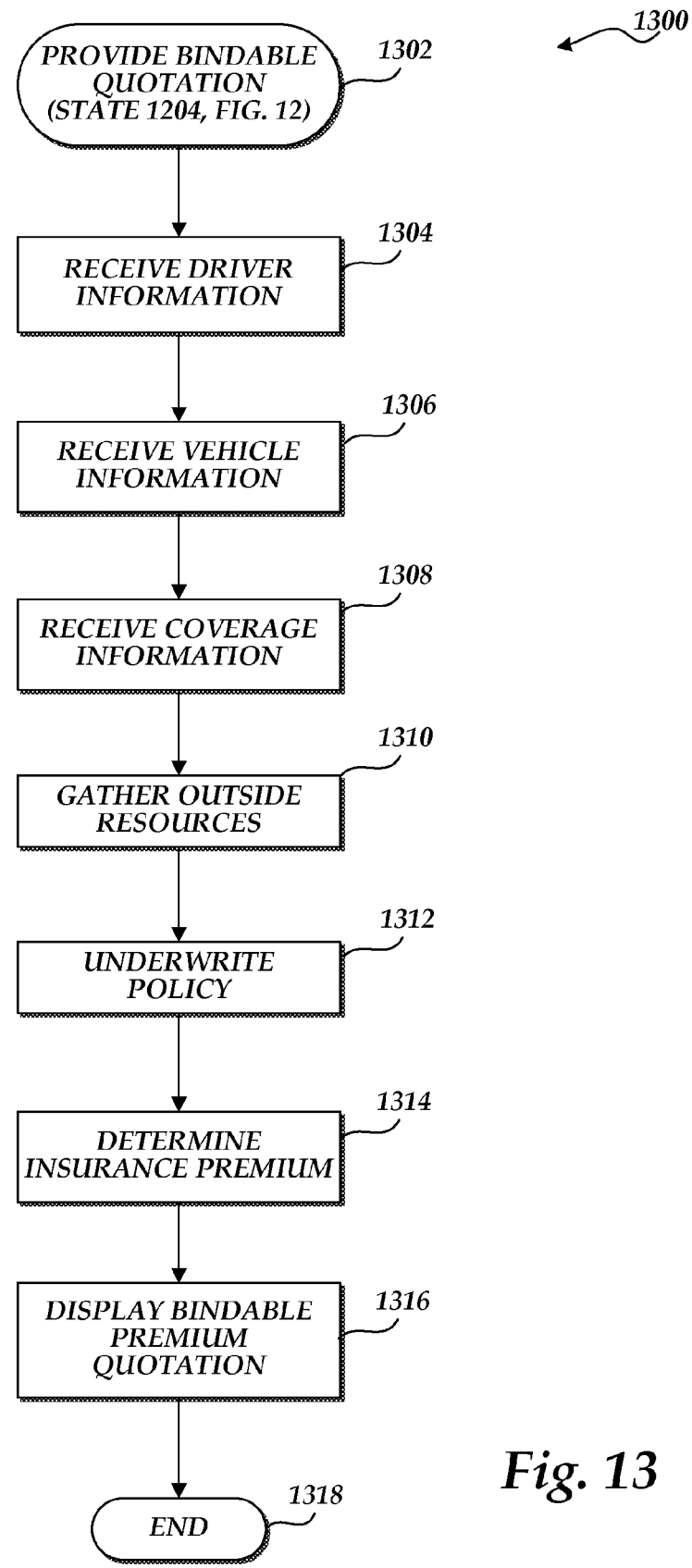
FIG. 13 is a flow diagram illustrating a method for providing a bindable insurance premium quotation according to an actual embodiment of the present invention.

Referring now to FIG. 13, an illustrative Routine 1300 for providing a bindable insurance quotation will be described. Routine 1300 begins at block 1304, where driver information is received from the customer. As described above, driver information may include the name, address, marital status, birth date, driver's license number and issuing state, social security number, occupation, and current insurance carrier and policy number for each individual to be insured. Once this information has been received, the Routine 1300 continues to block 1406, where vehicle information is received from the customer. Vehicle information may include the model year, make, primary use and operator of the vehicle, percentage of use per driver, miles driver per year, odometer reading, vehicle identification number, installed anti-theft devices, and garaging address for each vehicle to be insured. From block 1306, the Routine 1300 continues to block 1308.

At block 1308, information is received from the customer relating to the coverage to be provided under the requested insurance policy. This information may include the coverage effective date, the amount of bodily injury liability, property damage liability, personal injury protection, medical payments, uninsured motorist protection, underinsured motorist property damage protection and a requested deductible for the policy. Other information may also be received from the customer. From block 1308, the Routine 1300 continues to block 1310.

At block 1310, data is gathered from outside resources based upon the information provided by the customer relating to the individual to be insured. For instance, a credit report may be requested and received from an external provider of such data. Using this data, and the other data provided by the customer, the requested insurance policy is underwritten at block 1312. Methods for underwriting an insurance policy are well known to those skilled in the art.

From block 1312, the Routine 1300 continues to block 1314, where the insurance premium for the requested insurance policy is determined. As known to those skilled in the art, an insurance premium may be calculated based upon the geographical location of the individual to be insured, a risk factor associated with the individual, and a host of other factors. Once the insurance premium has been calculated, the Routine 1300 continues to block 1316, where the premium is displayed to the customer as a bindable insurance premium quotation that the customer may purchase immediately. The Routine 1300 then continues from block 1316 to block 1318, where it ends.

Referring now to FIG. 14, an illustrative Routine 1400 for re-intermediating an insurance agent will be described. Routine 1400 begins at block 1404, where the virtual insurance producer Web site makes a decision as to whether the customer has indicated that they would like to select an insurance agent based upon an existing relationship. For instance, the customer may want to select an insurance agent through whom they have previously purchased an insurance policy. If the customer makes such a selection, the Routine 1400 continues to block 1406, where the virtual insurance producer Web site provides a list of the insurance agents available to the customer and receives from the customer a selection of their desired agent. The list of agents may include all available agents or a subset of the available agents created based upon geography, area of expertise, or other factor. From block 1406, the Routine 1400 continues to block 1416.

If, at block 1404, the virtual insurance producer Web site determines that the customer has not indicated that they would like to select an insurance agent based upon an existing relationship, the Routine 1400 branches to block 1408. At block 1408, the virtual insurance producer Web site determines whether the customer has indicated that they would like to select an insurance agent based upon geographic location. If the customer has made such a selection, the Routine 1400 continues to block 1410, where the virtual insurance producer Web site provides a list of the geographically closest insurance agents to the customer and allows the customer to select an agent from the list. According to an embodiment of the present invention, the list may also indicate the geographical distance from the customer's address to the office of the insurance agent. From block 1410, Routine 1400 continues to block 1416.

If, at block 1408, the virtual insurance producer Web site determines that the customer has not indicated that they would like to select an insurance agent based upon geographic location, the Routine 1400 branches to block 1412. At block 1412, the virtual insurance producer Web site determines whether the customer has indicated that they would like an agent selected for them. If the customer has not made such an indication, the Routine 1400 branches to block 1404. If the customer has made such an indication, the Routine 1400 continues to block 1414, where the virtual insurance agent Web site selects an insurance agent for the customer. According to an actual embodiment of the present invention, the customer is assigned the insurance agent that is geographically closest to the customer. Routine 1400 then continues from block 1414 to block 1416.

At block 1416, the agent selected for the customer is assigned to the customer and to the new insurance policy purchased by the customer. As described above, this may entail creating a new entry in a policy management system database (shown in FIG. 3) assigning the selected agent to the customer. Once the selected agent has been assigned to the customer, the Routine 1400 continues to block 1418 where information regarding the customer and the insurance policy purchased by the customer are transmitted to the assigned agent. This information may include contact information for the customer and details regarding the type of policy purchased, and may be transmitted to the agent electronically or through non-electronic means. The Routine 1400 then continues from block 1418 to block 1420, where the selected agent may use this information to contact the customer directly. In this manner, the agent may provide to the customer personalized insurance services.

In exchange for providing such personalized service to the customer, a commission is paid to the agent at block 1422. The commission also be provided through an electronic funds transfer or through more traditional means of monetary transfer. In this manner, the insurance agent is re-intermediated into the on-line insurance sales process. The method 1400 ends at block 1424.

In light of the above, it should be appreciated by those skilled in the art that the present invention provides a method, system, apparatus, and computer-readable medium for providing insurance policies via a distributed computing network. While an actual embodiment of the invention has been illustrated and described, it will be appreciated that various changes can be made therein without departing from the spirit and scope of the invention.

The embodiments of the invention in which an exclusive property or privilege is claimed are defined as follows:

1. A system for providing an insurance policy via a distributed computing network, comprising:
   a server computer maintaining a virtual insurance producer Web site available via said distributed computing network, and wherein said virtual producer Web site is operative to:
      receive a request for a bindable premium quotation for an insurance policy;
      receive information relating to the insurability of an individual to be insured by said insurance policy and information relating to the coverage to be provided by said insurance policy in response to said request;
      gather underwriting information from one or more outside information resources based upon the identify of said individual;
      determine whether said insurance policy may be underwritten;
      to calculate a premium for said insurance policy and to provide said premium to a requestor of said premium quotation as a bindable insurance premium quotation;
   receive a request to purchase said insurance policy according to said bindable insurance premium quotation;
   re-intermediate an insurance agent; and
   issue said insurance policy.

2. The system of claim 1, wherein said virtual producer Web site is further operative to:
   provide an interactive help system to a requestor of said insurance policy.

3. The system of claim 2, wherein said interactive help system comprises an interactive chat facility for providing real-time communication between said requestor of said insurance policy and an insurance help-desk representative.

4. The system of claim 3, wherein said interactive help system further comprises an e-mail facility for receiving an electronic mail message from said requestor of said insurance policy and transmitting said message to an insurance help-desk representative.

5. The system of claim 4, wherein said interactive help system further comprises a facility for notifying an insurance help-desk representative that said requestor of said insurance policy would like to receive a telephone call providing assistance.

6. The system of claim 1, wherein issuing said insurance policy comprises transmitting an electronic version of said insurance policy to an individual insured by said insurance policy.

7. The system of claim 6, wherein re-intermediating an insurance agent comprises:
   providing a list of available insurance agents;
   receiving the selection of a selected agent from the list of available insurance agents;
   assigning said selected insurance agent to said insurance policy;
   transmitting information regarding said individual and said insurance policy to said selected insurance agent; and
   remitting a commission to said selected insurance agent.

8. The system of claim 6, wherein re-intermediating an insurance agent comprises:
   providing a list of available insurance agents, said available insurance agents identified based upon their geographical proximity to said individual;

receiving the selection of a selected agent from the list of available insurance agents;

assigning said selected insurance agent to said insurance policy;

transmitting information regarding said individual and said insurance policy to said selected insurance agent; and remitting a commission to said selected insurance agent.

9. The system of claim 6, wherein re-intermediating an insurance agent comprises:

assigning an insurance agent to said insurance policy based upon the geographical proximity of said insurance agent to said individual;

assigning said assigned insurance agent to said insurance policy;

transmitting information regarding said individual and said insurance policy to said assigned insurance agent; and remitting a commission to said assigned insurance agent.

10. The system of claim 9, wherein said assigned insurance agent comprises the geographically closest available insurance agent to said customer.

* * * * *

UNITED STATES PATENT AND TRADEMARK OFFICE
CERTIFICATE OF CORRECTION

| | | |
|---|---|---|
| PATENT NO. | : 7,925,523 B1 | |
| APPLICATION NO. | : 09/658770 | |
| DATED | : April 12, 2011 | |
| INVENTOR(S) | : F. J. McConnell et al. | |

It is certified that error appears in the above-identified patent and that said Letters Patent is hereby corrected as shown below:

| COLUMN | LINE | ERROR |
|---|---|---|
| 16 (Claim 1, | 20 line 14) | "identify" should read --identity-- |

Signed and Sealed this

Twenty-sixth Day of July, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,925,523 B1 | Page 1 of 1 |
| APPLICATION NO. | : 09/658770 | |
| DATED | : April 12, 2011 | |
| INVENTOR(S) | : F. J. McConnell et al. | |

It is certified that error appears in the above-identified patent and that said Letters Patent is hereby corrected as shown below:

| COLUMN | LINE | ERROR |
|---|---|---|
| 6 | 10 | "1 Mbps" should read --1 Mbp -- |
| 7 | 14 | "in distributed" should read -- in a distributed -- |
| 9 | 38 | "such a" should read -- such as a -- |
| 10 | 28 | "FIG. 6-14." should read -- FIGS. 6-14. -- |
| 13 | 43 | "transmitted the" should read -- transmitted to the -- |
| 14 | 23 | "miles driver per year," should read -- miles per driver per year, -- |
| 15 | 58 | after "commission" insert -- will -- |

Signed and Sealed this
Seventeenth Day of July, 2012

David J. Kappos
*Director of the United States Patent and Trademark Office*